(12) United States Patent
Hamilton

(10) Patent No.: US 12,644,718 B2
(45) Date of Patent: Jun. 2, 2026

(54) VEHICLE ENERGY ROUTING

(71) Applicant: Oregon State University, Corvallis, OR (US)

(72) Inventor: David Hamilton, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 124 days.

(21) Appl. No.: 18/349,569

(22) Filed: Jul. 10, 2023

(65) Prior Publication Data

US 2025/0020478 A1 Jan. 16, 2025

(51) Int. Cl.
*G01C 21/34* (2006.01)
*B60L 53/20* (2019.01)

(52) U.S. Cl.
CPC .......... *G01C 21/3469* (2013.01); *B60L 53/20* (2019.02); *B60L 2240/62* (2013.01)

(58) Field of Classification Search
None
See application file for complete search history.

(56) References Cited

U.S. PATENT DOCUMENTS

| | | | |
|---|---|---|---|
| 8,290,701 B2 | 10/2012 | Mason et al. | |
| 8,384,710 B2 | 2/2013 | Schlottman et al. | |
| 8,886,453 B2 | 11/2014 | Cerecke et al. | |
| 10,151,596 B2 | 12/2018 | Stankoulov | |
| 10,502,578 B2 | 12/2019 | Chen et al. | |
| 10,846,937 B2 | 11/2020 | Rogers et al. | |
| 11,215,469 B2 | 1/2022 | De Nunzio et al. | |
| 11,471,775 B2 | 10/2022 | Benzies | |
| 2013/0325335 A1 | 12/2013 | Kee et al. | |
| 2016/0153796 A1 * | 6/2016 | Stankoulov | G01C 21/3469 |
| | | | 701/123 |
| 2023/0316927 A1 * | 10/2023 | Kumavat | B60W 60/00256 |
| | | | 701/25 |

FOREIGN PATENT DOCUMENTS

| | | | | |
|---|---|---|---|---|
| DE | 102021125957 A1 * | 4/2022 | ........... | B60W 10/08 |
| KR | 20180053995 A * | 5/2018 | ............... | B60L 7/10 |

OTHER PUBLICATIONS

ArcMap 10.8, Algorithms used by the ArcGIS Network Analyst Extension. Retrieved from https://desktop.arcgis.com/en/arcmap/latest/extensions/network-analyst/algorithms-used-by-network-analyst.htm on Jul. 5, 2023. 3 pages.
Bellman "On a Routing Problem," Quarterly of Applied Mathematics, vol. XVI, No. 1, 1958, pp. 87-90 (4 pages).
Clegg "A Review of Regenerative Braking Systems," Working Paper. Institute of Transport Studies, University of Leeds, Leeds, UK, 1996 (24 pages).

(Continued)

*Primary Examiner* — Hitesh Patel
*Assistant Examiner* — Tabitha Kress
(74) *Attorney, Agent, or Firm* — Mughal Gaudry & Franklin PC

(57) ABSTRACT

Briefly, embodiments, such as estimating energy utilization based at least in part on estimated regenerative energy production to select one or more preferred routes for an electric vehicle out of a network of routes, for example, are described.

20 Claims, 12 Drawing Sheets
(6 of 12 Drawing Sheet(s) Filed in Color)

110

Source (Harvest Site)

○ Nodes 160
——— Polylines 150
▬▬ Route 130
○—○ Road Segment 140

Destination (Mill)

120

100

(56) References Cited

OTHER PUBLICATIONS

Ding et al., "Forecasting the Sales and Stock of Electric Vehicles Using a Novel Self-Adaptive Optimized Grey Model," Engineering Applications of Artificial Intelligence, vol. 100, Apr. 2021, https://doi.org/10.1016/j.engappai.2020.104148 (13 pages).

Forrest et al., "Estimating the Technical Feasibility of Fuel Cell and Battery Electric Vehicles for the Medium and Heavy Duty Sectors in California," Applied Energy, vol. 276, Oct. 15, 2020, https://doi.org/10.1016/j.apenergy.2020.115439 (13 pages).

Grebner et al., "A Practical Framework for Evaluating Hauling Costs," International Journal of Forest Engineering, vol. 16, No. 2, Jun. 18, 2013, https://www.tandfonline.com/doi/abs/10.1080/14942119.2005.10702520 (15 pages).

Guido van Rossum and the Python Development Team, The Python Library Reference, Release 3.8.2, Feb. 28, 2020 (106 pages).

Hagberg et al., "Exploring Network Structure, Dynamics, and Function Using Networkx," Los Alamos National Lab, Los Alamos, NM, Conference: SCIPY 08; Aug. 21, 2008, Pasadena, CA. (6 pages).

Harris et al., "Array Programming with NumPy," https://doi.org/10.1038/s41586-020-2649-2, Sep. 16, 2020 (6 pages).

Hudak et al., "Integration of Lidar and Landsat ETM+ Data for Estimating and Mapping Forest Canopy Height," in Remote Sensing of Environment 82 (2002), pp. 397-416 (20 pages).

Hunter, "Matplotlib: A 2D Graphics Environment," IEEE Computing in Science and Engineering, vol. 9, No. 3, May-Jun. 2007, doi: 10.1109/MCSE.2007.55, pp. 90-95 (6 pages).

Kim "Dijkstra Algorithm: Key to Finding the Shortest Path, Google Map to Waze," https://medium.com/@yk392/dijkstra-algorithm-key-to-finding-the-shortest-path-google-map-to-waze-56ff3d9f92f0, Jun. 12, 2019 (19 pages).

Konstantinou et al., "Examining the Barriers to Electric Truck Adoption as a System: A Grey-DEMATEL Approach," in Transportation Research Interdisciplinary Perspectives, vol. 17, Jan. 2023, https://doi.org/10.1016/j.trip.2022.100746 (18 pages).

Leonard et al., "Electrification of a Class 8 Heavy-Duty Truck Considering Battery Pack Sizing and Cargo Capacity," in Applied Science, Special Issue: Novel Hybrid Intelligence Techniques in Engineering, 2022, vol. 12, No. 19, https://doi.org/10.3390/app12199683 (17 pages).

Marshall et al., "A Forest Management Information System for Education, Research, and Operations," in Journal of Forestry-Washington, Jan. 1997 (5 pages).

Sessions et al., "Harvesting Elevation Potential from Mountain Forests," in International Journal of Forest Engineering, 2018, vol. 29, No. 3, doi/abs/10.1080/14942119.2018.1527173, pp. 192-198 (8 pages).

Hamilton et al., "Forestry Electric Vehicle Energy Routing and Mapping GIS Tool," International Journal of Forest Engineering 2024, vol. 35, No. 3, 482-497. https://doi.org/10.1080/14942119.2024.2353501 (17 pages).

* cited by examiner

110

Source (Harvest Site)

Nodes 160

Polylines 150

Route 130

Road Segment 140

Destination (Mill)

120

100

First Device
202

Third Device
206

Network
208

Second Device
204

Communication
Interface
230

Input/Output
232

Processor
220

215

Memory
222

Primary
Memory
224

Secondary
Memory
226

Device-Readable Medium
240

200

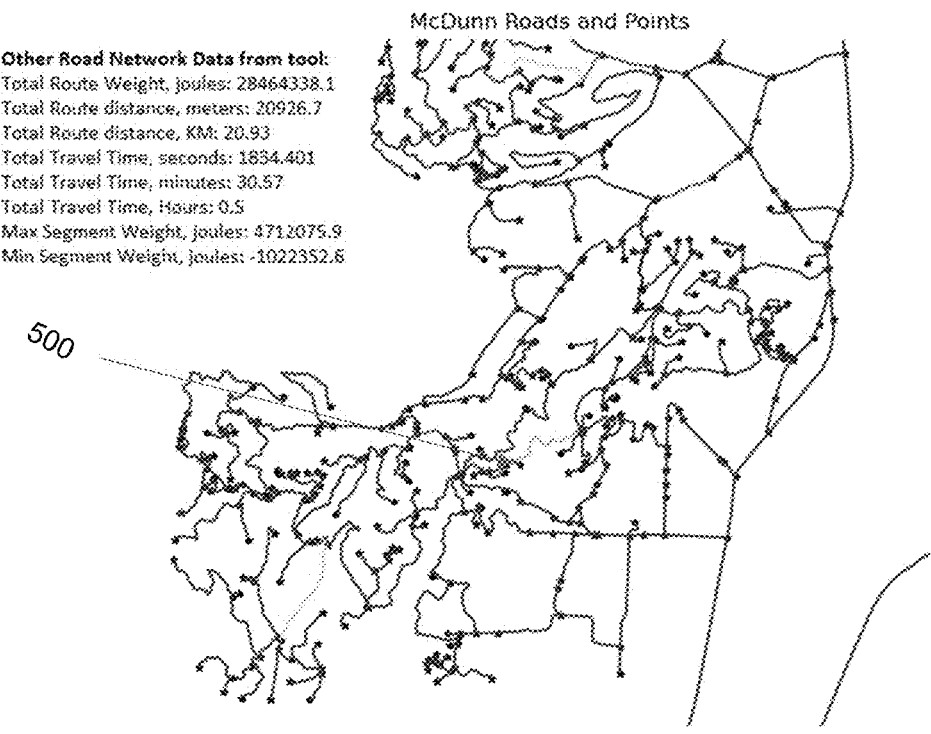
Other Road Network Data from tool:
Total Route Weight, joules: 28464338.1
Total Route distance, meters: 20926.7
Total Route distance, KM: 20.93
Total Travel Time, seconds: 1834.401
Total Travel Time, minutes: 30.57
Total Travel Time, Hours: 0.5
Max Segment Weight, joules: 4712075.9
Min Segment Weight, joules: -1022352.8
McDunn Roads and Points
500
Energy bar below is energy gained or lost in joules
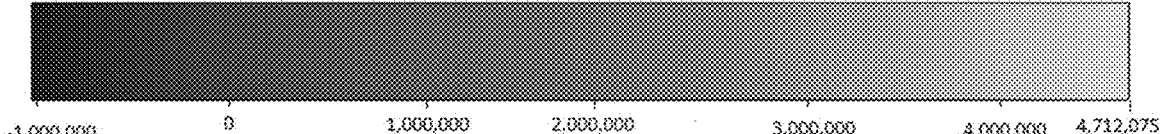
-1,000,000          0          1,000,000          2,000,000          3,000,000          4,000,000    4,712,075
FIG. 5

| TruckNum | TruckName | Weight (kg) | Tare | Load | PowertrainEff | RegenEff | Frontal Area (m2) |
|---|---|---|---|---|---|---|---|
| 1 | Edison Model R-500 - Tandem | 36,287 | 16,287 | 20,000 | 0.75 | 0.7 | 7.43 |
| 2 | Edison Model R-500 - Tandem | 16,287 | 16,287 | 0 | 0.75 | 0.7 | 4.65 |
| 3 | ELTModel2 | 12474 | 12474 | 0 | 0.75 | 0.6 | 4.65 |
| 4 | ELTModel3 | 12474 | 12474 | 0 | 0.75 | 0.2 | 7.43 |
| 5 | DieselModel1 | 12474 | 12474 | 0 | 0.5 | 0 | 4.65 |
| 6 | DieselModel2 | 17474 | 12474 | 5000 | 0.5 | 0 | 7.43 |
| 7 | DieselModel3 | 12474 | 12474 | 0 | 0.5 | 0 | 4.65 |
| 8 | DieselModel4 | 17474 | 12474 | 5000 | 0.5 | 0 | 7.43 |
| 9 | ATV | 468 | 268 | 200 | 0.6 | 0 | 1 |
| 10 | PickupTruck | 2611 | 2111 | 500 | 0.6 | 0 | 2.2 |

FIG. 6

*If Theta* ≥ 0, then:

$$Edge\ weight = (AR + RR + GR)$$

*If (Theta < 0) and* (|GR| ≤ (AR + RR)), then:

$$Edge\ Weight = (AR + RR - |GR|) / \text{Power train efficiency (\%)}$$

*If (Theta < 0) and* (|GR| > (AR + RR)) *and Regen Efficiency (%)* > 0, then:

$$Edge\ Weight = -1 \times (|GR| - AR - RR) \times Regen\ Efficiency\ (\%)$$

If *(Theta < 0) and* (|GR| > (AR + RR)) *and Regen Efficiency (%)* = 0 then:

$$Edge\ Weight = 0$$

Where:

$$AR = 0.5989 \times Frontal\ Area\ (m^2) \times Velocity(\tfrac{m}{s}) \times Velocity(\tfrac{m}{s}) \times Edge\ Length(m)$$

$$RR = Rolling\ Resistance\ (\tfrac{kg}{kg}) \times Truck\ Weight(kg) \times \cos\cos(Theta) \times Edge\ Length(m)$$

$$GR = Truck\ Weight(kg) \times \sin(Theta) \times Edge\ Length(m)$$

FIG. 7

Table A:  Node table with overlayed DEM elevation in meters

| Node ID | Road_Edge1 | Road_Edge2 | Road_Edge3 | Road_Edge4 | Elev_meter |
|---|---|---|---|---|---|
| 0 | 2 | 0 | 0 | 0 | 224 |
| 1 | 2 | 21 | 22 | 0 | 230 |
| 2 | 4 | 0 | 0 | 0 | 230 |
| 3 | 5 | 0 | 0 | 0 | 250 |
| 4 | 6 | 0 | 0 | 0 | 194 |
| 5 | 10 | 11 | 6 | 0 | 192 |

Table B: Road/edge table

| Road_ID | ROAD_Class | Surface_Type | Road_Name | Length_Meters | Rolling_Resistance | Velocity (m/s) |
|---|---|---|---|---|---|---|
| 2 | forest roads | rock | 6021.2 | 298.3320381 | 0.018 | 11.176 |
| 4 | forest roads | rock | 672 | 531.6758855 | 0.018 | 11.176 |
| 5 | forest roads | rock | 672.3 | 486.8199347 | 0.018 | 11.176 |
| 6 | forest roads | rock | 612.6 | 299.5158887 | 0.018 | 11.176 |
| 8 | forest roads | rock | 672 | 79.97434643 | 0.018 | 11.176 |
| 9 | forest roads | rock | 612 | 759.5280121 | 0.018 | 11.176 |
| 10 | forest roads | rock | 612.6 | 85.16987866 | 0.018 | 11.176 |
| 11 | forest roads | dirt | 612.62 | 229.4020279 | 0.018 | 11.176 |
| 12 | forest roads | dirt | 6021.4 | 817.5411017 | 0.018 | 11.176 |
| 13 | forest roads | dirt | 612.622 | 17.7616551 | 0.018 | 11.176 |

FIG. 8

Table C: Parameters for the Edison Model R-500

| Truck # | Truck Name | Weight (kg) | Tare (kg) | Load (kg) | Powertrain Efficiency (%) | Regen Efficiency (%) | Frontal Area (m2) |
|---|---|---|---|---|---|---|---|
| 1 | Edison Model R-500 - Tandem | 36287 | 16287 | 20000 | 75 | 70 | 7.43 |
| 2 | Edison Model R-500 - Tandem | 16287 | 16287 | 0 | 75 | 70 | 4.65 |

VEHICLE ENERGY ROUTING

STATEMENT OF GOVERNMENT INTEREST

This invention was made with government support under DE-SC0024965 awarded by the U.S. Department of Energy. The government has certain rights in the invention.

TECHNICAL FIELD

This disclosure relates to routing of vehicles and, in particular, generating a map of energy utilization by a vehicle in order to facilitate routing thereof.

BACKGROUND

New laws and regulations in California, Oregon and other states that are in force or soon to be in force are directed to mandating that some percentage of vehicles in the future to be zero emission, referring to carbon emissions. Manufacturers, of course, are therefore producing more electric vehicles (EVs) to meet the demand, but potential customers may be hesitant to adopt EVs, especially for certain situations. It is noted, here, that the term EV, while referring to vehicles in which motion of the vehicle is powered by electric power, is intended to include vehicles in which motion of the vehicle is powered in part by electric power. It is understood, for the purposes of this document, that an EV may include, for example, a so-called hybrid vehicle in which other types of fuel, such as fuel derived from hydrocarbons, may also be used to power motion by the vehicle in conjunction with electric power.

One barrier to EV adoption may be referred to here as "range anxiety." A concern that the particular electric vehicle may not have sufficient charge stored, for example, in an on-board battery supplying electric power for the motion of the vehicle to complete performance of a particular function or task before being able to renew its charge, such as via a charging station. Although this may be a concern in a variety of possible EV situations, this concern may exist, as one example, especially with heavy duty (e.g., class 8) trucks; however, other EV vehicles are not intended to be excluded from this discussion and/or coverage by this patent application, > As one illustrative, non-limiting example, in forestry, a typical and practical way to transport timber and equipment is via heavy duty trucks. However, those in the business of such transportation may be hesitant to invest in electric trucks (ETs), particularly electric logging trucks (ELTs), due at least in part to the typical remote nature of forest harvest operations. Again, as before, it is understood, for the purpose of this document, that these electric vehicles, such as an ET or ELT, may include a so-called hybrid vehicle in which other types of fuel, such fuel derived from hydrocarbons, may be used to power the movement of the vehicle in conjunction with electric power. For purposes of discussion convenience, however, vehicles that primarily or even exclusively rely on electric power are discussed, with no loss in generality. In fact, even situations involving vehicles powered entirely by fuel derived from hydrocarbons, such as diesel, for example, may, in forestry, for example, have "range anxiety" concerns and, as a result, may be within the scope of claimed subject matter.

Consequently, the situation for ELTs, again, as only an example, may raise several concerns. First, because forests often exist in remote areas, an electric or even a hybrid truck may not be able to find a charging station in a location sufficient to permit it to complete its task of hauling heavy logs, for example, along a route, which may include returning to a home base, for example. (Again, as mentioned, a similar concern may also exist for vehicles powered only by hydrocarbons, such as diesel, but the concern may be even greater for EVs due at least in part to limited battery capacity and/or a limited number of charging stations in remote vicinities). Second, and related to the first concern, it may be that while an ELT may be suitable in forestry for some forest routes, certain other forest routes used to harvest timber may not be feasible for an ELT because the distance is so great and the route so remote that the truck would not be able to pick up harvested logs at a location, haul the harvested logs, for example, to their destination, and return before draining an on-board battery of its charge with a recharge.

While approaches, such as regenerative braking combined with gravitational potential energy, for example, may provide the opportunity to increase the effective range of electric logging trucks by permitting some charging of the vehicle battery along its route, it may, nonetheless, be difficult to predict for particular remote areas, whether an ET or an ELT, for example, would be able to feasibly complete a particular transportation task along a particular route. In the context of this patent application, regenerative braking and/or regenerative energy production refers to an energy recovery mechanism that slows down a moving vehicle or object by converting its kinetic energy into a form that can be either used immediately or stored for later use.

Again, it is noted that forestry is used as a non-limiting example. A host of other situations may have similar concerns, such as mining operations, farming operations, and even, for example, mail//package delivery, for example, in remote locations and it is intended to include these within the scope of claimed subject matter as well.

A need, therefore, exists for electric vehicle purchasers to have a mechanism to assess whether a particular vehicle will be suitable for particular tasks that may consume significant electric energy from an electric vehicle's battery before making a purchase decision and/or, likewise, a need exists for electric vehicle owners to have a mechanism to assess, before using a particular electric vehicle for a particular task, whether the particular vehicle will be suitable to complete the particular task or will, instead, consume such amounts of electric energy from the electric vehicle's battery to make completing the task not feasible.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIG. 5 is an illustration of the map of FIG. 3, in which estimated energy utilization, taking into account estimated energy regeneration production, is employed to select one or more preferred routes for an electric vehicle able to perform energy regeneration production, for an embodiment in accordance with claimed subject matter;

FIG. 6 is a table of parameter values for potential vehicles and potential loads for use in generating a map similar to the map of FIG. 4 or for use in selecting a preferred route similar to the preferred route of FIG. 5, for an embodiment in accordance with claimed subject matter;

FIG. 7 is a set of formulas for use in computing estimates of edge weights for a network or graph for an embodiment in accordance with claimed subject matter;

FIG. 8 are tables used to facilitate generation of the map of FIG. 3 in accordance with an embodiment of claimed subject matter;

FIG. 10 is a table of parameters for vehicles and loads used to generate the colored map of FIG. 4, depicting estimated energy utilization across the landscape, taking into account estimated energy regeneration production, for an embodiment in accordance with claimed subject matter;

DETAILED DESCRIPTION

Figure 1:
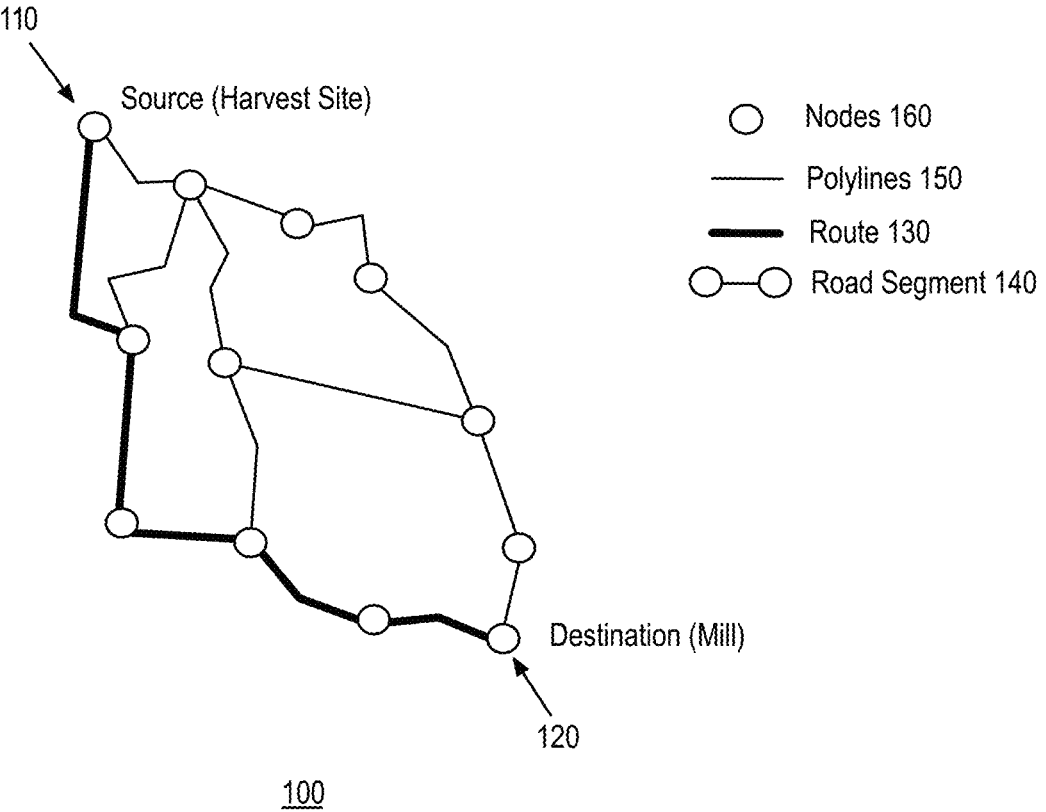
FIG. 1 is an illustration of a schematic diagram showing an embodiment of a network or graph in accordance with claimed subject matter.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents. Rather, it is to be understood that other embodiments are contemplated and may be utilized. Also, embodiments have been provided of claimed subject matter herein and it is noted that, as such, those illustrative embodiments may be inventive and/or unconventional; however, claimed subject matter is not necessarily limited to embodiments provided primarily for illustrative purposes. Thus, while advantages may have been described in connection with illustrative embodiments, claimed subject matter may be inventive and/or unconventional for additional reasons not expressly mentioned in connection with those embodiments. In addition, references throughout this specification to "claimed subject matter" refer to subject matter intended to be covered by one or more claims and are not necessarily intended to refer to a complete claim set, to a particular combination of claims and/or claim sets (e.g., method claims, apparatus claims, etc.), and/or to only a particular claim.

In general, the world uses energy to maintain physical comfort, to manufacture, for transport, for communications, for agriculture and for industry. Thus, main uses of controlled energy include transport, agriculture, industry, commerce and households. A typical example is in the case of powering movement of a vehicle for completing a transporting task. Although for most of the past, fuels made from hydrocarbons have been a dominant source to power movement of such vehicles, electric power as a source of energy for vehicle movement is becoming more popular, for example, to reduce carbon emissions. A hydrocarbon is an organic compound consisting of hydrogen and carbon found in crude oil, natural gas, and coal. Hydrocarbons are highly combustible and has been the main energy source of the world. Its uses include gasoline, jet fuel, propane, kerosene, and diesel, to name just a few. However, carbon emissions are a byproduct of such combustion and may have a detrimental environmental impact, making electric power more desirable if able to be feasibly employed in various situations.

Electric power, for a situation in which it supplies energy for vehicle movement, is typically stored in a battery as charge and powering the vehicle, such as for movement, may drain that energy from the battery. In situations in which a so-called electric vehicle is involved, then, such energy, again, in the form of charge, should be replenished.

As also previously mentioned, forestry is discussed with reference to an illustrative embodiment of claimed subject matter; however, it is not intended that claimed subject matter be limited in scope to example illustrations. As was mentioned, for example, a host of other situations may have similar concerns, such as mining operations, farming operations, and even, for example, mail/package delivery, for example, in remote locations. It is intended that claimed subject matter cover all applicable other situations, including some not in remote locations.

However, continuing with logging as an illustration, it may come as a surprise to a layperson that typically 40-60% of the cost of harvesting lumber may be attributable to fuel costs. This problem has been recognized and discussed in the literature. For example, forest planners may select travel routes for a vehicle hauling logs to limit fuel consumption in situations employing hydrocarbon derived fuel to power the vehicles hauling the logs.

In a typical situation, a logging truck may travel to the top of a hill, pick up a heavy load, and then travel downhill for delivery to a mill at lower elevations. Likewise, the truck may make a return trip to get its next load. It has also been recognized, due at least in part to this change in elevation, one may harvest (or capture) some of the potential energy and/or kinetic energy associated with a particular route to conserve on round trip fuel costs. For example, regenerative braking combined with gravitational potential energy may provide an opportunity to increase the effective range of electric logging trucks, again, as a non-limiting illustration.

It is noted, here, that likewise, claimed subject matter is not necessarily restricted to regenerative energy production, such as via regenerative braking. For example, as described in more detail later, in an embodiment, a vehicle might also include a solar panel, for example, and also use solar energy to potentially increase the effective range of an electric vehicle, such as an electric logging truck. In such a case, for example, one might also include real-time weather reports and/or traffic reports to assist in routing and/or scheduling associated with an embodiment that also captures solar energy.

Whether a vehicle uses hydrocarbon fuel or electric power, this use (i.e., consumption) of energy may be viewed as a cost. However, the manner to preferably reduce such costs by much more effectively capturing energy via regenerative braking, for example, along a few selecting routes over a large number of potential routes, such as a host of possible routes across a landscape, remains unclear. Toward an objective of reducing fuel costs, forest road networks are typically designed with timber located at high elevations and mills or log sort yards located at low elevations. Likewise, as alluded to above, electric vehicles (EVs) may provide an additional opportunity via "regenerative braking," for example, to capture the vehicle's kinetic energy by charging the battery while braking. This stored energy may then be used along the route to increase the potential range for the EV. However, as suggested, how to choose such routes going up and down to more effectively take advantage of the energy able to be captured in this manner is unclear. Again, as previously suggested, energy recapture may be particularly desirable for terrain that is remote and may, therefore, rarely provide access to charging stations, electricity, or even other types of fuel.

Although route planning is a well-studied area of technology, such as in operations research and/or computer science, for a variety of reasons, energy recapture using regenerative braking systems, for example, does not appear to have been considered in connection with such technology. Various processes are known, for example, to determine a "shortest cost" path or route between the nodes of a network connected by edges in which the edges have weights to reflect a "cost." See Kim, Y. M. Dijkstra Algorithm: Key to Finding the Shortest Path, Google Map to Waze Available online: https://medium.com/@yk392/dijkstra-algorithm-key-to-finding-the-shortest-path-google-map-to-waze-56ff3d9f92f0 #:~: text=Google%20Map%20is%20based%20on, and%20pioneer%20in%20computing%20science. (accessed on 8 Jun. 2023).

Typically, a computer or computing device is used to make such a determination using values assigned to the edges of a network. Typically, a "cost" refers to distance or time; however, in accordance with an embodiment, edge weights might instead be estimates of energy utilization if a particular edge were traversed by a particular vehicle for a network of edges connecting nodes. In this manner, routes may potentially be identified by calculating energy utilization in a manner that takes into account energy regeneration production. Energy utilization of an electric vehicle, here, net energy usage, therefore, may include energy regeneration by the electric vehicle during performance of a particular task. Thus, for travel along routes within a network by a vehicle, such as a vehicle able to haul, carry, and/or transport, etc., a load (e.g., a loadable vehicle), net energy usage (e.g., energy utilization) may be estimated via computer operation and/or processing.

As a non-limiting example of an implementation, now with reference to FIG. 1, consider an embodiment 100 of a graph or network of routes for use in route selection. Again, this network is a different type of network than network 208 (FIG. 2) to make sure common terminology for different situations does not result in some confusion. Embodiment 100, here, comprises a network of routes, such as may exist across a particular landscape. Embodiment 100, as shown, includes a source 110 and a destination 120. Likewise, the network embodiment includes one or more routes 130 shown as a series of interconnected road segments 140 (also referred to as "edges"), which may, in an embodiment, be further broken into subunit polylines 150, that may connect nodes 160 in network embodiment 100 and which may, in an embodiment be directional. Road segments 140, in a non-limiting implementation, may have associated parameters that typically have been estimated, including: estimated distance, estimated slope and/or other ground condition factors, which, for an example implementation, may affect estimates of rolling resistance of a vehicle, for example.

An embodiment of a graph or network may comprise a multidirectional graph of edges (not shown in FIG. 1) in which an edge may include a weight estimate calculated, for example, using parameter estimates associated with road segments of the multidirectional graph or network embodiment. For example, a weight along an edge of road segments may reflect an estimated amount of energy gained or lost by a vehicle traveling along the particular edge in the particular direction of the edge. It is noted here that the terms graph and network may be used interchangeably throughout this document with no loss in comprehension, understanding and/or generality. Calculation of edge weight estimates for an embodiment are described in more detail below. It is noted here that it is assumed that such edge weight estimates, in this embodiment, are intended for a vehicle capable of regenerative energy production, such as a vehicle with a battery able to be charged at least in part via regenerative braking of the vehicle, and, further, that this was a factor in calculating edge weight estimates, which may assist in determining routing of the vehicle through a remote area, for example.

This illustrative implementation, or other examples thereof, discussed in more detail below, may address some deficiencies that exist with other similar approaches to routing of vehicles, especially electric vehicles. For example, other approaches may use distance or time estimates as edge weights and then compute energy gain or loss. However, such an approach may not result in selection of a preferred route to sufficiently reduce energy utilization, at least compared with other available routes, in the case of a vehicle with regenerative braking, for example. Other routing approaches may also not be multidirectional and/or may not accommodate negative weights. Such approaches, therefore, may not properly account for energy recapture via regenerative energy production as a result. Finally, no researchers appear to have developed a methodology for spatially measuring energy across road segments for vehicles with regenerative braking, particularly, for example, in mountainous, forested terrain with favorable road grades and different loads at high and low elevations. Thus, again, such other approaches may not result in a preferred route to sufficiently reduce estimated energy utilization compared with other available routes for use in hauling timber, as one example, and/or may not properly account for the possibility of energy recapture.

Figure 2:
FIG. 2 is an illustration of a schematic diagram showing an embodiment of a computing and/or communications network that includes several computing devices able to mutually communicate via the computing and/or communications network.

Now, referring to FIG. 2, for an embodiment, example devices, such as shown in FIG. 2, may comprise features, for example, of a client computing device and/or a server computing device, in an embodiment in accordance with claimed subject matter. It is further noted that the term computing device, in general, whether employed as a client and/or as a server, or otherwise, refers at least to a processor and a memory connected by a communication bus. A "processor," for example, is understood to connote a specific structure such as a central processing unit (CPU) of a computing device which may include a control unit and an execution unit. In an aspect, a processor may comprise a device that interprets and executes instructions to process input signals to provide output signals.

Thus, as suggested, an embodiment of claimed subject matter may include a computing device, such as computing device 204. Memory 222 of device 204 may provide one or more sources of executable computer instructions in the form physical states and/or signals (e.g., stored as memory states), for example. Computing device 202 ('first device' in the figure) may communicate with computing device 204 by way of a network connection, such as via computing and/or communications network 208, for example. (It is noted that, here, reference is made to a computing and/or communications network, not to be confused with a network of routes across a landscape, for example.) A network connection in the context of network 208, for example, while physical, typically may not necessarily be tangible, such as a wireless connection (in comparison to a wired connection, for example). Although computing device 204 of FIG. 2 shows various tangible, physical components, claimed subject matter is not limited to a computing device having only these tangible components as other implementations and/or embodiments may include alternative arrangements that may comprise additional tangible components or fewer tangible components, for example, that may likewise function differently while achieving similar results. Rather, examples are provided merely as illustrations. It is not intended that claimed subject matter be limited in scope to illustrative examples.

Memory 222 may comprise any non-transitory storage mechanism. Memory 222 may comprise, for example, primary memory 224 and secondary memory 226, additional memory circuits, mechanisms, or combinations thereof. Memory 222 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 222 may be utilized to store a program of executable instructions, such as executable computer instructions. For example, processor 220 may fetch executable instructions from memory and proceed to execute the fetched instructions. Memory 222 may also comprise a memory controller for accessing device-readable medium 240 that may carry and/or make accessible digital content, which may include code, and/or instructions, for example, executable by processor 220 and/or some other device, such as a controller, as one example, capable of executing instructions, such as computer instructions, for example. Under direction of processor 220, a non-transitory memory, such as memory cells storing physical states (e.g., memory states), comprising, for example, a program of executable instructions, may be executed by processor 220 and able to generate signals to be communicated via a network, such as network 208, for example, as previously described. Generated signals may also be stored in memory as physical memory states, also previously suggested.

Thus, for example, in an embodiment, a computing device, such as 204, may include executable instructions stored via one or more memories. Thus, in an embodiment, executing instructions by one or more processors of computing device, such as 204, that may be coupled to one or more memories, such as memory 222, may result in performance of a method, such as a method of generating a map of energy utilization, as discussed in more detail below. An embodiment, for example, may comprise executing instructions that may result in performance of a method in accordance with claimed subject matter, in which the instructions may be executed by a computing device with a display, such as a smart phone or tablet, but as mentioned previously and as later discussed, may likewise comprise a computer that is part of a computing and/or communications network in which the device may comprise a client and/or server.

For example, in an embodiment in accordance with claimed subject matter, executing the instructions may result in routing of one or more electric vehicles using one or more multidirectional network graphs with negative edge weight estimates to account for estimated regenerative energy production, such as from regenerative braking, along segments of the multidirectional network graphs. Likewise, the routing may comprise using estimated energy loss and/or generation as an edge weight, in an embodiment. For example, for an embodiment, one or more multidirectional network graphs may represent a landscape, and the routing of one or more electric vehicles using one or more multidirectional network graphs with negative edge weight estimates to account for estimated regenerative breaking, for example, may facilitate generation of a color-coded map depicting estimated energy expenditure by the one or more electric vehicles if used to travel routes across the landscape hauling a load, for example.

For example, as shall be described in more detail, an energy utilization map for a graph and/or network of routes may be generated and/or displayed based at least in part on estimated regenerative energy production along the routes by a vehicle, such as a loadable vehicle that, for example, includes a battery chargeable via regenerative energy production. Again, however, it is noted that claimed subject matter is not limited in scope in this respect. As examples, such a map may be generated for a variety of vehicles of different sizes, shapes and/or weights. Likewise, a vehicle may comprise a hybrid vehicle, a diesel vehicle, and/or may involve multiple vehicles.

For example, in an embodiment, a start point and an end point within a network may be selected, in an embodiment, by a user who may be operating a computing device, such as 204. Again, therefore, for an embodiment, energy utilization, for travel along the routes within the network by an electric vehicle, such as a vehicle able to haul, carry, and/or transport, etc. a load (e.g., a loadable vehicle), may be estimated via computer operation and/or processing Again, the loadable vehicle may comprise an electric vehicle capable of regenerative energy production.

Figure 3:
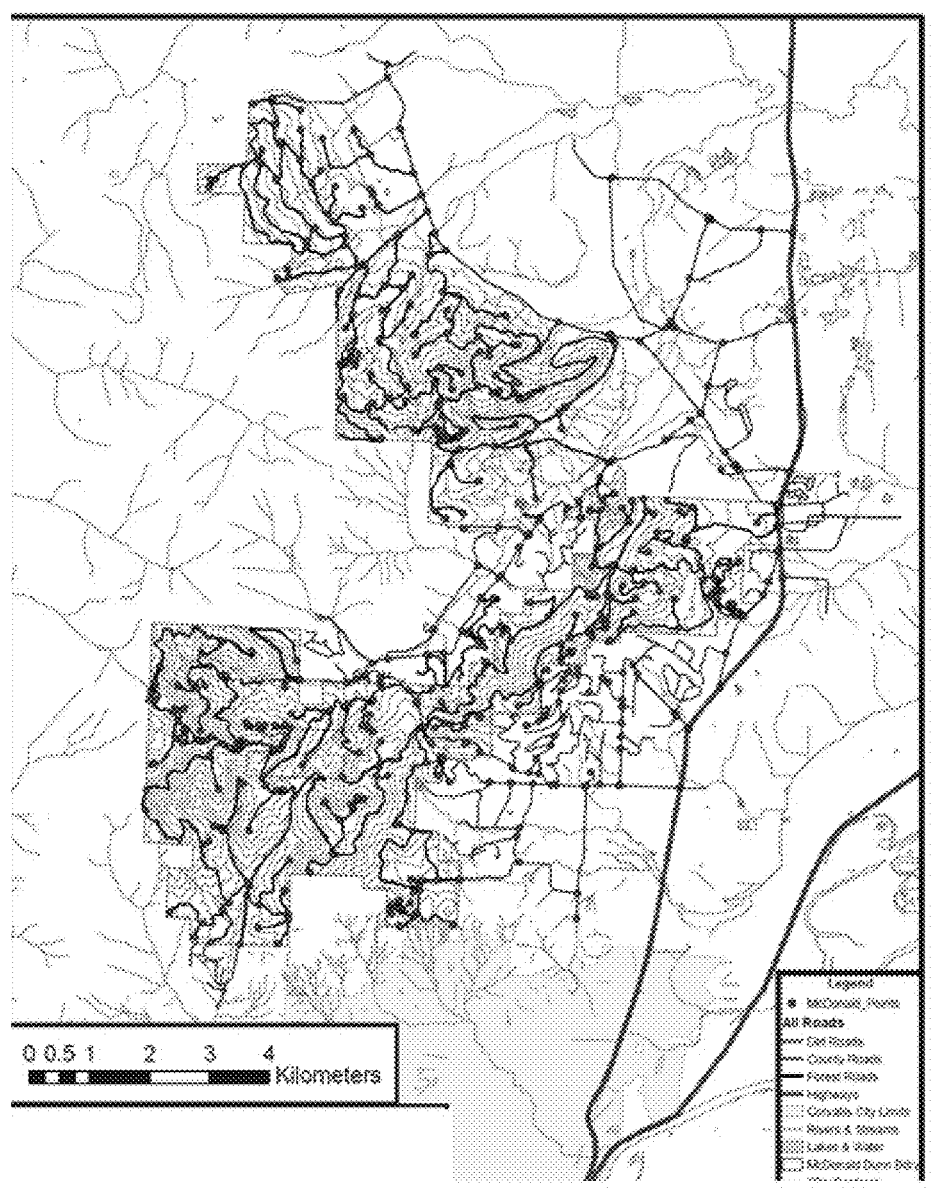
FIG. 3 is an illustration of a map of a landscape, for which a network of nodes and edges has been constructed, for an embodiment in accordance with claimed subject matter.

Thus, in an embodiment, from the start point to one or more respective successive intermediate points within the network and from the one or more respective successive intermediate points to the end point, energy utilization may be estimated based at least in part on the estimated regenerative energy production along the routes by the loadable vehicle for situations in which the loadable vehicle, for example, may be unloaded, partially loaded, such as loaded with one or more partial loads along the route, and/or fully loaded. As described in more detail later, this energy estimation may be performed for a host of possible routes within the network and/or with the vehicle carrying a host of possible loads. Essentially, such an estimation may be performed for virtually all of the possible routes within a network, such as illustrated in FIG. 3 and described immediately below, if not for literally all of the possible routes within a network, in an embodiment, again, with a host of possible loads.

As simply a non-limiting illustrative example, one route may be referred to, here, as a trip because it may include several stops. For example, the vehicle may route from a start point unloaded to a first intermediate point where the vehicle may be partially loaded with timber, the vehicle may then route to another possible, second intermediate point and may be loaded with more timber. The vehicle may then route to the endpoint and be unloaded. However, alternatively, for this trip, the vehicle may route to a third, intermediate point and be partially unloaded, before travel to the end point, where it may be completely unloaded.

Using a computing device, such as 204, for example, this estimation may be done across a forest landscape with starting (e.g., start), ending (e.g., end), and intermediate points. Such a landscape is illustrated in FIG. 3. FIG. 3 shows the McDonald Dunn research forest, located to the north of Corvallis, Oregon and managed by Oregon State University's College of Forestry. The forest is over 4700 ha (47 km2) in size. Conveniently, the GIS database contains values related to harvest polygon units (also referred to as "harvest unit polygons," herein) and road lines for that forest developed starting in the 1980's and has been continued to be used for forest management since the late 1990's. In an embodiment, as suggested, energy estimations for routes across a landscape, such as this example, may be performed by representing this landscape as a network. Using values attributable to the network, such as edge weights reflecting estimates of energy lost or gained from travel by a vehicle along those edges, energy utilization estimations may be made, accumulated and/or organized, in an embodiment, and employed to generate an energy utilization map, such as on a display, illustrated, for example in FIG. 4. For example, such a map may be displayed on a smart phone, a tablet with touch screen technology, or even on a networked computer monitor, as a few examples.

In particular, in an embodiment, as shown, a map of such a network including the routes may be coded, such as color coded, to depict estimated energy utilization. For example, coding on a display, such as display coupled to device 204, for example, may result in a color-coded displayed map of the routes within the network in which estimated energy utilization along the routes within the network may be color coded based at least in part on estimated regenerative production, as just discussed.

As shown, colors may operate as a visual aid to, for example, a route planner. The colors inform the route planner regarding those routes that may be more energy efficient than others, taking into account regenerative energy production. Although colors are a convenient method of coding, other methods may alternately and/or additionally be employed, such as shading, hatching, gray scale, etc.

Such a map may also be of use to others besides route planners. For example, those in the business of transporting, especially difficult to transport items, such as logs, as one illustration, may employ such a map in connection with an evaluation of and/or a purchase of a heavy-duty electric truck, such as an electric logging truck.

Furthermore, it is noted that in an embodiment, in addition to generating an energy utilization map, as described, likewise, one or more preferred routes of the available routes shown by a displayed map, for example, may be selected based at least in part on estimated energy utilization taking into account estimated regenerative energy production by a loadable vehicle, such as one capable of regenerative energy production. Thus, such one or more preferred routes may be highlighted on a displayed map, such as illustrated in FIG. 5, for example, by multicolored route 500. Thus, FIG. 5 shows the network of routes from FIG. 3 but without the contours, as are shown by FIG. 3 to represent elevation.

Of course, again, claimed subject matter is not limited in scope to illustrative embodiments. For example, in another embodiment, for routes within a network, instead, of a multi-point or multi-route journey, as described above, energy utilization may be estimated for an unloaded loadable vehicle from a start point to an intermediate point within the network and for the unloaded loadable vehicle from that intermediate point to the end point. This estimation may then be performed for a host of respective intermediate points within the network, if not the entire set of intermediate points included within the network. The details of this process, for an embodiment, such as this illustrative embodiment, is described in more detail below. However, because regenerative energy production in included in choosing routing between the start point and the end point, estimated energy utilization may be based at least in part on estimated regenerative energy production along routes by the vehicle between the start point and the end point via any of the intermediate points within the network. Likewise, a similar estimation process from end point to start point of a loaded loadable truck may be performed.

To more specifically illustrate an embodiment, a process for generating an energy utilization map may include the following. A loadable vehicle and a load may be selected. A multidirectional network of routes for a loaded loadable vehicle and for an unloaded loadable vehicle, in which the routes respectively comprise a series of respective interconnected road segments, may be generated.

For the respective interconnected road segments forming the routes within the respective multidirectional networks, an estimated edge weight calculation for the loaded loadable vehicle and for the unloaded loadable vehicle based at least in part on a set of factors may be performed. Examples of factors, shown in more detail below, may include: estimated regenerative energy production, if any, along the respective interconnected road segments by the vehicle, estimated distance traveled along the respective interconnected road segments by the vehicle, estimated slope along the respective interconnected road segments; estimated rolling resistance of the vehicle along the respective interconnected road segments for the vehicle and/or of the road; estimated air resistance along the respective interconnected road segments for the vehicle and/or estimated gravity resistance along the respective interconnected road segments for the vehicle, as week as road material along the respective interconnected road segments, and/or road type of the respective interconnected road, etc.

Via estimated edge weights of the respective interconnected road segments, the lowest cost and/or lower cost paths, at least in terms of estimated energy utilization, of traveling between a start point and an end point to and from respective intermediate points in the network may be determined. Thus, for such an embodiment, one or more preferred routes may be produced while generating energy utilization map using estimates of energy utilization. As suggested and illustrated, having determined estimated energy utilization between the start point and end point via one or more preferred routes that includes respective intermediate points, a displayed map may be coded to depict estimated energy utilization across the landscape for travel by a vehicle, such as a loadable vehicle, along the one or more preferred routes within the network based at least in part on estimated regenerative energy production.

Thus, for example, to illustrate selection of vehicle and load, a selection may be made from a table, which, in an embodiment, may be stored in the memory of a computing device. FIG. 6, for example, includes a table of existing and hypothetical vehicles with hypothetical loads. In the table of FIG. 6, "Tare" refers to the weight of the listed truck as an empty container, whereas "Weight" refers to the weight of the truck including its load from the table. Note also that the table includes for the respective vehicles listed, an estimate of regenerative energy efficiency ("RegenEff" in FIG. 6), an estimate of drive train efficiency ("PowertrainEff" in FIG. 6), and an estimate of size of the frontal cross section of the vehicle ("Frontal Area" in FIG. 6). These estimated parameters, for example, may be employed to calculate energy usage estimates to be used as edge weights for edges of a network, in one embodiment. Hence, to generate FIG. 4, truck model parameters used comprise those shown in FIG. 10 for the R500 Tri Drive hybrid electric truck produced by Edison motors. The table of FIG. 10 has estimates of regenerative efficiency ("Regen Efficiency" in FIG. 10) in the table and estimates of drive train efficiency ("Powertrain Efficiency" in FIG. 10), as well as estimates of tare weight and load weight, as discussed previously with respect to FIG. 8. The R500 truck comprises a heavy-duty truck configured for forestry operations with a regenerative braking system. The regenerative breaking efficiency estimate typically ranges between 60-80%. Although the vehicle specifications allow for a gross axle rating of 39,000 kg (86,100 lbs), 36,287 kg (80,000 lbs), as shown in FIG. 10, was used as an estimate to comply with Oregon truck weight limits.

Likewise, to perform processing to estimate energy utilization, a network representation of a chosen landscape, e.g., a network of routes, in which the selection of preferred routes may take place, for an embodiment, is to be constructed, similar to the network shown in FIG. 1, which may, for example, be done for the landscape illustrated in FIG. 3. In other words, as suggested, a multi-directional network may be constructed, in this example embodiment.

Thus, parameter estimates comprise values related to particular routes. This may, in an implementation, include a Digital Elevation Model (DEM) that comprises a representation of the bare ground (bare earth) topographic surface of the Earth excluding trees, buildings, and other surface objects The digital elevation model (DEM) comprises, here, lidar derived raster layers shown in TIFF format, although claimed subject matter is not intended to be limited to this example. There may also be Environment Systems Research, Inc., (ESRI) shapefiles of "harvest polygon units," road polylines and node point files, such as from the GIS database mentioned previously, for the landscape of FIG. 3. See ESRI Algorithms Used by the ArcGIS Network Analyst Extension, available online: https://desktop.arcgis.com/en/arcmap/latest/extensions/network-analyst/algorithms-used-by-network-analyst.htm (accessed on 8 Jun. 2023). It is noted, here, that ESRI shape files associated with GIS are not necessarily limited to harvest polygon units. Rather, in another application, as suggested, such as mining, farming, and/or perhaps mail or package delivery, such files may capture other situations, such as city or country neighborhoods, housing, supply and/or receiving areas, etc. Furthermore, claimed subject matter is not limited to ESRI shape files associated with GIS. Again, this example is provided as an illustration. However, other approaches to capturing features, including parameter estimates of a landscape, useful for routing and/or mapping movement of vehicles, such as electric vehicles, is intended to be included within claimed subject matter.

However, continuing with this illustration, in an embodiment, the DEM (e.g., elevation model) may be overlaid on points (e.g., nodes) so that roads from the shapefiles may be used to approximate estimated values for edge connections between nodes (e.g., points), as described in more detail below. The tables shown in FIG. 8 provide one illustrative example of how this may be accomplished in one embodiment, as explained below. It is noted, of course, that other ways of constructing a network may be employed and this is merely provided as one illustrative embodiment.

However, continuing, these tables may be constructed from the DEM and ESRI shape files, and may be used in conjunction with GIS software, for example, to display routes for a chosen landscape (e.g., network of routes). "Harvest unit" (e.g., harvest polygon unit or harvest unit polygon) is a term of art and refers, in general, to an area of land from which timber may be harvested. In this embodiment, harvest units comprise polygon shaped areas included in the ESRI shape files. Table A in FIG. 8, for example, illustrates a table of nodes (e.g., "Node ID") at particular elevations (e.g., "Elev_meter") connected by edges (e.g., "Road_Edge 1", "Road_Edge 2", etc.) which, again, represent roads for this illustration. Table B in FIG. 8 then illustrates road condition type estimates (e.g., "ROAD_Class", "Surface_Type", "Length_Meters", "Rolling_Resistance", "Velocity") associated with particular edges, to be used to perform calculations, such as illustrated in FIG. 7, which relate to calculation of estimates for edge weights, as described below for this embodiment.

The lidar measurements used to derive the DEM were acquired from an airborne platform. Elevations in the area of interest appear to range from 58 to 650 meters with an accuracy of 75 cm (horizontal) and 30 cm (vertical). Likewise, to generate FIG. 4, the DEM was also trimmed to remove segments outside the area of interest. In addition, harvest polygon units in the ESRI shape files were also trimmed to improve visualization and were split if a harvest polygon unit could access multiple harvest landings. Road lines in the ESRI shape files were also split at intersections and harvest landings and those split locations along with the end point of the road line were saved as node points. Surrounding highway and road networks were included to access harvest polygon units with harvest landings inaccessible to the road network inside the forest. Velocity of a vehicle used to generate FIG. 4 for a road segment, such as shown in Table B of FIG. 8 ("Velocity") typically comprises the designated speed limit for the road, if one is available.

The node points were assigned an elevation value by overlaying the DEM content. Attributes of the nearest harvest landing were assigned with respect to the harvest polygon unit. Road length attributes were calculated using the trimmed files. Estimated rolling resistance (e.g., "Road_Resistance" in FIG. 8) coefficient values were assigned to segments in accordance with road material ("Surface_Type in FIG. 8). For example, the estimated rolling resistance coefficient attribute of a normal force was set to 0.013 kg/kg for paved concrete and was set to 0.018 kg/kg for gravel using estimates from the Logging Road Handbook, Byrne, J. J.; Nelson, R. J.; Googins, P. H. Logging Road Handbook: The Effect of Road Design on Hauling Costs 1960. These are then used to estimate rolling resistance of a vehicle over roads of that surface type in an embodiment, such as illustrated by FIG. 7, for example.

After vehicle and load selection, and construction of a multidirectional network for respective vehicle types (e.g., in this illustrative embodiment, a loaded vehicle and an unloaded vehicle), edge weight estimates ("Edge weight" in FIG. 7) may be calculated substantially in accordance with the formulas of FIG. 7. Edge weight estimates, in one embodiment, may be determined in accordance with a set of equations that comprise a modified version of formulas developed by Sessions and Lyons, see Sessions, J.; Lyons, C. K. Harvesting Elevation Potential from Mountain Forests. *International Journal of Forest Engineering* 2018, 29, 192-198. The formulas factor in estimated air resistance of a vehicle (e.g., "AR" in FIG. 7), estimated rolling resistance of a vehicle (e.g., "RR" in FIG. 7)) and estimated gravitational resistance of a vehicle (e.g., "GR" in FIG. 7) measured in joules. The detailed formulas for this illustration are provided in FIG. 7. It is noted that these formulas may accommodate vehicles with regenerative braking (e.g., "Regen Efficiency" in FIG. 7), but do not account for effects of limited battery capacity on energy utilization. Therefore, claimed subject matter is not limited in scope to these exact formulas. More complex or simpler formulas may be employed in other embodiments of claimed subject matter. For example, formulas may accommodate vehicles without regenerative braking and/or may account for the effect of battery capacity for use in an embodiment. More complex models may also take into account other factors that may affect energy utilization estimation, such as harnessing solar power along a trip, as an example, and/or other factors as described below.

The logic associated with calculation of estimates for edge weights for this illustration may be inferred from the formulas. In particular, regenerative efficiency (e.g., estimate "Regen Efficiency" in FIG. 7) may typically occur in situations in which force due to gravity resistance of a vehicle (e.g., estimate "GR" in FIG. 7) overcomes force due to air resistance of a vehicle (e.g., estimate "AR" in FIG. 7) and rolling resistance of a vehicle (e.g., "RR" in FIG. 7). However, such energy is not perfectly recaptured. Therefore, the formula includes a factor to show that an estimated percentage (e.g., "Regen Efficiency" in FIG. 7) of this regenerative energy is lost. Likewise, the calculation also employs an estimate of rolling resistance due to the road material ("Rolling Resistance"), which may be used in conjunction with an estimate of slope (e.g., "Theta" in FIG. 7), an estimate of distance for a road segment (e.g., "Edge Length" in FIG. 7), and an estimate of truck weight (e.g., "Truck Weight" in FIG. 7) to compute an estimate of rolling resistance (e.g., "RR" in FIG. 7) for a vehicle, in this embodiment. Additional parameters employed to calculate estimates of edge weights include an estimate of truck velocity ("Velocity" in FIG. 7), an estimate of drive train efficiency (e.g., "Power train efficiency" in FIG. 7), and an estimate of frontal area (e.g., "Frontal Area" in FIG. 7).

Thus, having selected the vehicle and load, estimates as edge weights for two networks, one in which a vehicle is loaded and another in which a vehicle is unloaded, may be calculated. The edge weight estimates, after computation, may then be employed in a further computation for estimated energy expended or regenerated across a road segment if the selected vehicle with the selected load, for example, were to traverse the road segment.

Now, an energy utilization map may be generated using a start point and end point, along with the various parameters and derived values discussed, such as the estimates to be used as edge weights. As suggested, in this illustration, a constructed network represents a forest landscape. The harvest polygon units of the forest landscape include harvest landings which represent locations within the harvest unit at which a truck may stop and/or turn around. These harvest landings are depicted as intermediate points within the network to which a vehicle may travel. Thus, in theory, an unloaded vehicle may traverse roads of the network to reach a selected intermediate point, such as a particular harvest landing, from a start point. Likewise, the vehicle may traverse roads from the intermediate point, such as the particular harvest landing, to reach the end point. However, there are a variety of routes that may be selected to travel from the start to this intermediate point and then from this intermediate point to the end point. Thus, a process, referred to the Bellman-Ford process or algorithm, See Bellman, R. On a Routing Problem. *Quarterly of Applied Mathematic* 1958, 12, 87-90, may be employed to select a preferred route, or one or more preferred routes, from the available alternative routes from the start point to the end point via this intermediate point based at least in part on estimation of energy utilization at least taking into account estimated regenerative energy production for an unloaded vehicle.

A similar approach, then, may be employed for a return trip of the vehicle after being loaded. Again, in theory, a loaded vehicle may traverse roads of the network to reach a selected intermediate point, such as a particular harvest landing, from the end point. Likewise, the vehicle may traverse roads from that intermediate point to reach the start point. However, again, there are a variety of routes that may be selected to travel from the end point to this intermediate point, which comprises a particular harvest landing, and then from this intermediate point to the start point. Thus, the same process, the Bellman-Ford process or algorithm, may be employed to select one or more preferred routes of the available alternative routes from the end point to the start point via this intermediate point based at least in part on estimated energy utilization taking into account regenerative energy production for a loaded vehicle. Advantages of using the Bellman-Ford process over other approaches include its ability to handle directional edges in a network of nodes and edges and also its ability to handle negative weights (such as if energy is being generated rather than consumed). Thus, this calculation may be performed for the available intermediate points within the network in the manner described.

Ultimately, as result of such a process, using the Bellman-Ford results, a preferred route or a few preferred routes to travel between the start point and the end point (and a preferred route or a few preferred routes from the end point to the start point) may be identified, which may be highlighted on a displayed map, such as a map generated and displayed using the ESRI shape files and DEM content with some adjustments as previously discussed, for this embodiment. In addition to an estimation of energy utilization, likewise, an estimate of travel time and travel distance may also be calculated, as well as other potentially useful estimates in an embodiment.

Figure 4:
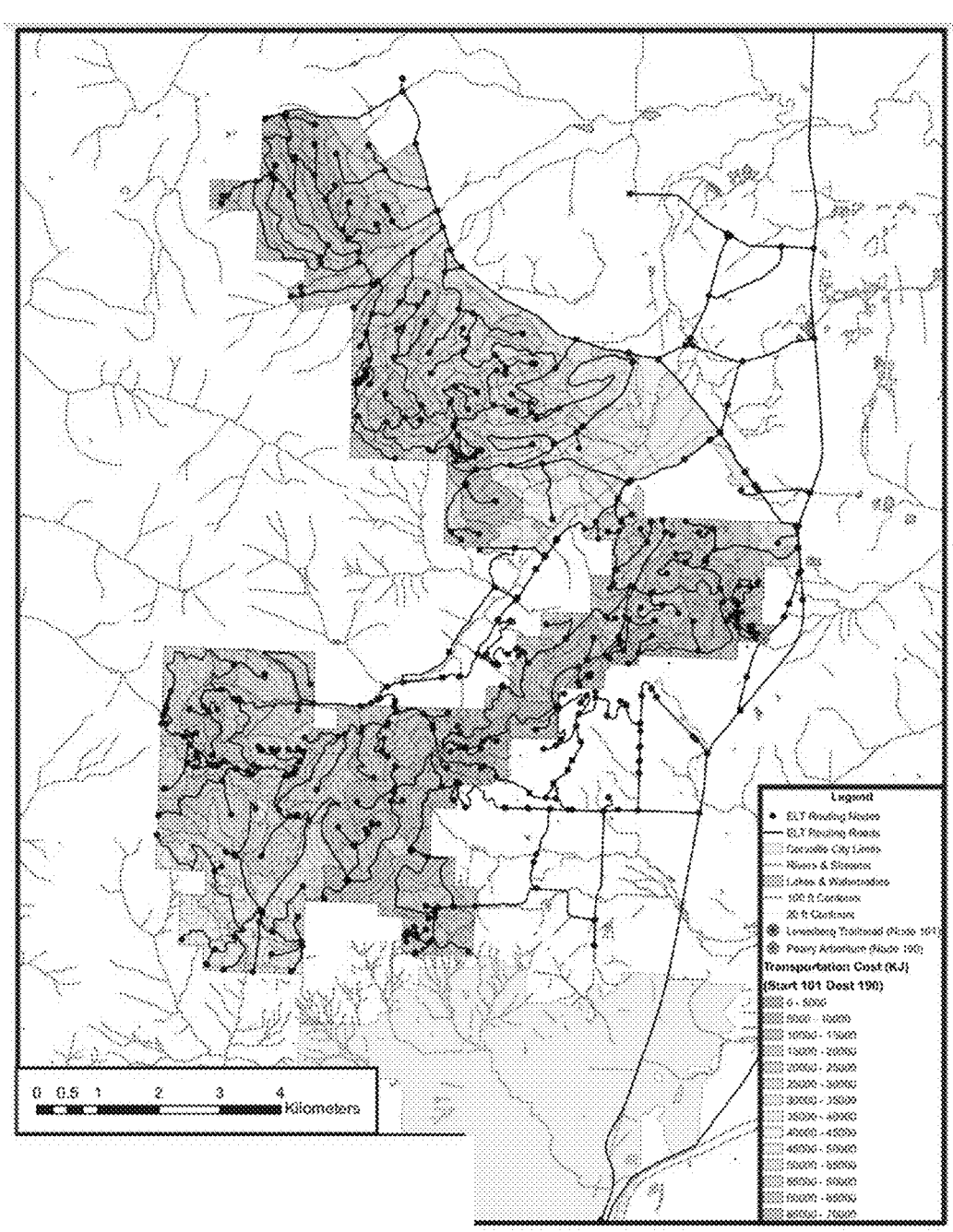
FIG. 4 is an illustration of the map of FIG. 3, in which colors across the landscape are used to depict estimated energy utilization, taking into account estimated energy regeneration production, for an embodiment in accordance with claimed subject matter.

Furthermore, in an embodiment using the Bellman-Ford results, routing and estimated energy utilization for travel between the start point and the end point via the respective harvest landings of the respective harvest polygon units of the network may be identified. Thus, a map may be generated on a display coupled to a computing device, such as shown in FIG. 3, again, here, from ESRI shape files, also showing road lines and node points, and also using elevation estimates form DEM values, in which the harvest polygon units may be coded, such as color coded, to depict an estimate of energy utilization for travel between the start point and the end point via a particular harvest polygon unit, as shown in FIG. 4.

Figure 11:
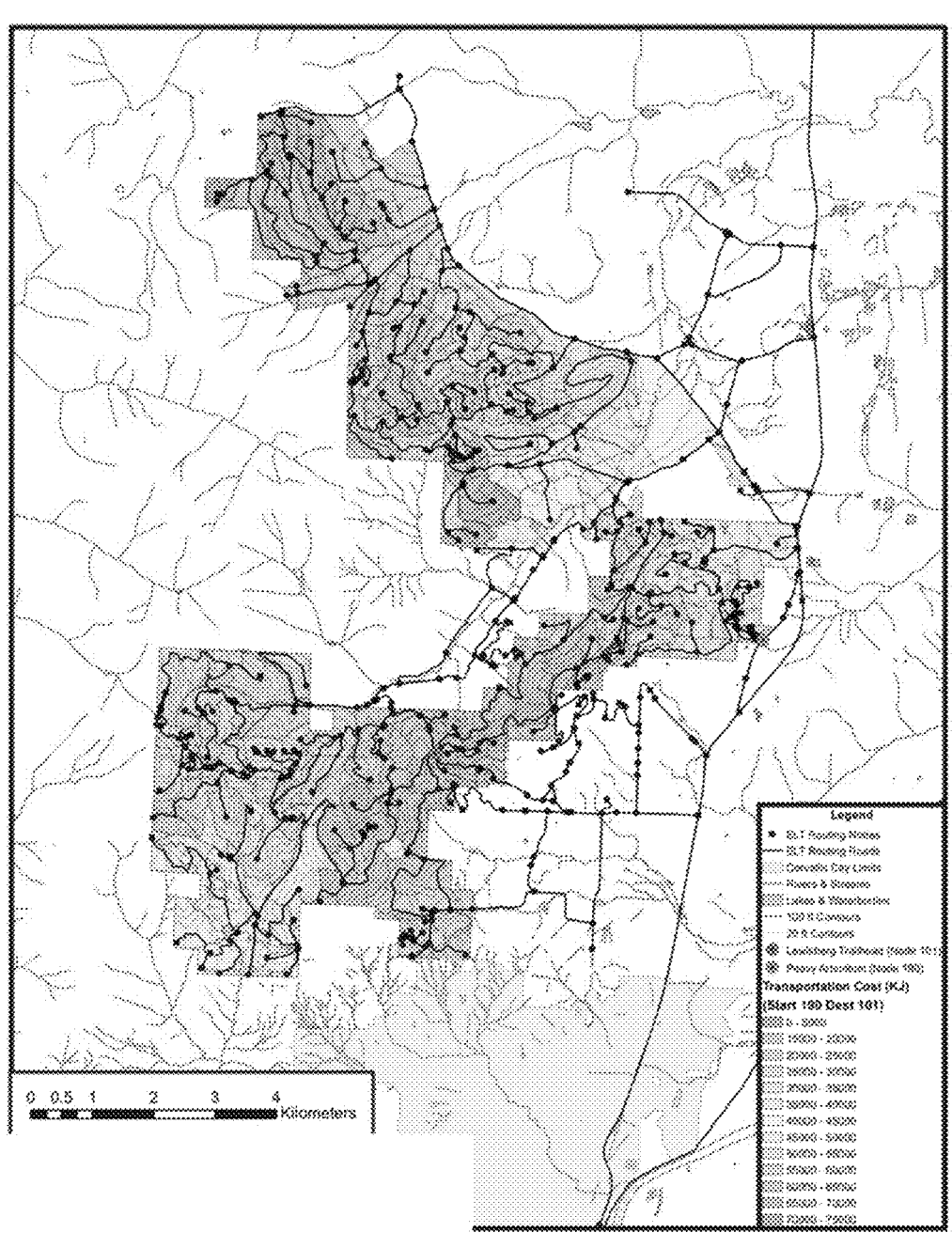
FIG. 11 is an illustration of the map of FIG. 3, in which colors across a landscape are used to depict estimated energy utilization, taking into account estimated energy regeneration production, for an embodiment in accordance with claimed subject matter.

As suggested, for an embodiment, estimated energy utilization for a route that includes a particular harvest polygon unit may be used to determine color. Thus, in FIG. 4, the harvest polygon units are colored based on estimated energy utilization (Kilo Joules) for an empty R-500 Tandem traveling from the Lewisburg Trailhead to the particular harvest polygon and then traveling back loaded to the Peavy Arboretum. In FIG. 11, on the other hand, the harvest polygon units are colored based on estimated energy utilization (Kilo Joules) for an empty R-500 tandem traveling from the Peavy Arboretum to the harvest polygon and then traveling back loaded to the Lewisburg Trailhead. A benefit includes that such a map makes readily apparent those areas that produce more energy efficiency if traveled compared to those areas that produce less energy efficiency if traveled.

Although claimed subject matter is not limited in scope in this respect, embodiments may include a variety of additional or alternative features. For example, an embodiment implemented on a smart phone or a tablet, for example, may permit a driver of a loadable vehicle (e.g., a user) to select from a menu of available options, which may include, vehicle selection, load selection and/or selections of start and end points. Likewise, an embodiment or implementation may permit selection of other factors that may be used in conjunction with calculations, such as those previously described. These may include various contingencies, such as a maximum trip or route distance, maximum travel time and/or maximum cost, as examples. Cost may refer to estimated energy utilization, but may include additional elements, such as estimated cost of labor, estimated equipment wear and tear, etc. Typically, a system on board a vehicle, which, again, in an embodiment, may comprise a smart phone, may display on a graphical user interface, for example, for a user, one or more preferred routes, potentially with calculation results so that a user may make a selection taking into account tradeoffs, such as estimated energy utilization versus estimated travel time, as examples. Likewise, in an embodiment, an on-board system may include a GPS position-location system to locate the vehicle and track movement along a selected, preferred route.

In another embodiment, a system may be at least partially cloud based, such as a network in the cloud (this network, again, may comprise a computing and/or communications network, which is distinguished from the previously described network of routes across a landscape). In an embodiment, such as the foregoing, one or even a fleet of vehicles may respectively include a GPS tracking system and wireless network connection for use in tracking and/or scheduling movement of various vehicles in the fleet along various selected preferred routes for those vehicles. Likewise, an embodiment may comprise a database, accessible via network wireless connections, for example, to assist in managing such tracking and/or scheduling of a fleet of vehicles. In an embodiment, additional features may be available via network connections, for example, possibly in association with a tracking database, with such features integrated into a system, to optionally provide weather reports, traffic reports, road work reports, etc., typically, as real-time updates, to further facilitate tracking and/or scheduling of vehicle movements, such as multi-vehicle movements.

Likewise, in an embodiment, a vehicle might also include a solar panel, for example, and also use solar energy to potentially increase the effective range of an electric vehicle, such as an electric logging truck. In such a case, for example, one might also include real-time weather reports and/or real-time traffic reports to assist in routing and/or scheduling associated with an embodiment that also captures solar energy. Thus, in an embodiment, for example, edge weight estimates may include estimates of energy captured via solar power generation. Hence, routing and/or map generation may be implemented that includes this feature.

As suggested previously, in other embodiments, generation of an energy utilization map and/or selection of one or more routes based at least in part on estimated regenerative energy production along various routes may be performed in a manner to potentially trade off other additional factors beyond estimated regenerative energy production that may affect selection of a route, such as estimated distance, estimated travel time and/or other estimated costs beyond the cost of estimated energy use for a particular trip along a particular route. As a simple example, if estimated travel time is expected to be no more than 100 minutes then only routes estimated to be within 10% or 110 minutes might, for example, be feasibly considered.

As has been previously noted as well, an embodiment may be general enough to account for energy utilization by one or vehicles without regenerative energy production, such as vehicles fueled by hydrocarbons like diesel and/or other vehicles operating on electric power supplied by a charged battery. It is noted that computation of edge weights may in such an embodiment be modified to produce different estimates for the edge weights so that a network of routes for such a scenario, may, instead, take into account fuel and/or charge consumption along various routes without consideration of regenerative energy production for a particular vehicle.

Figure 9:
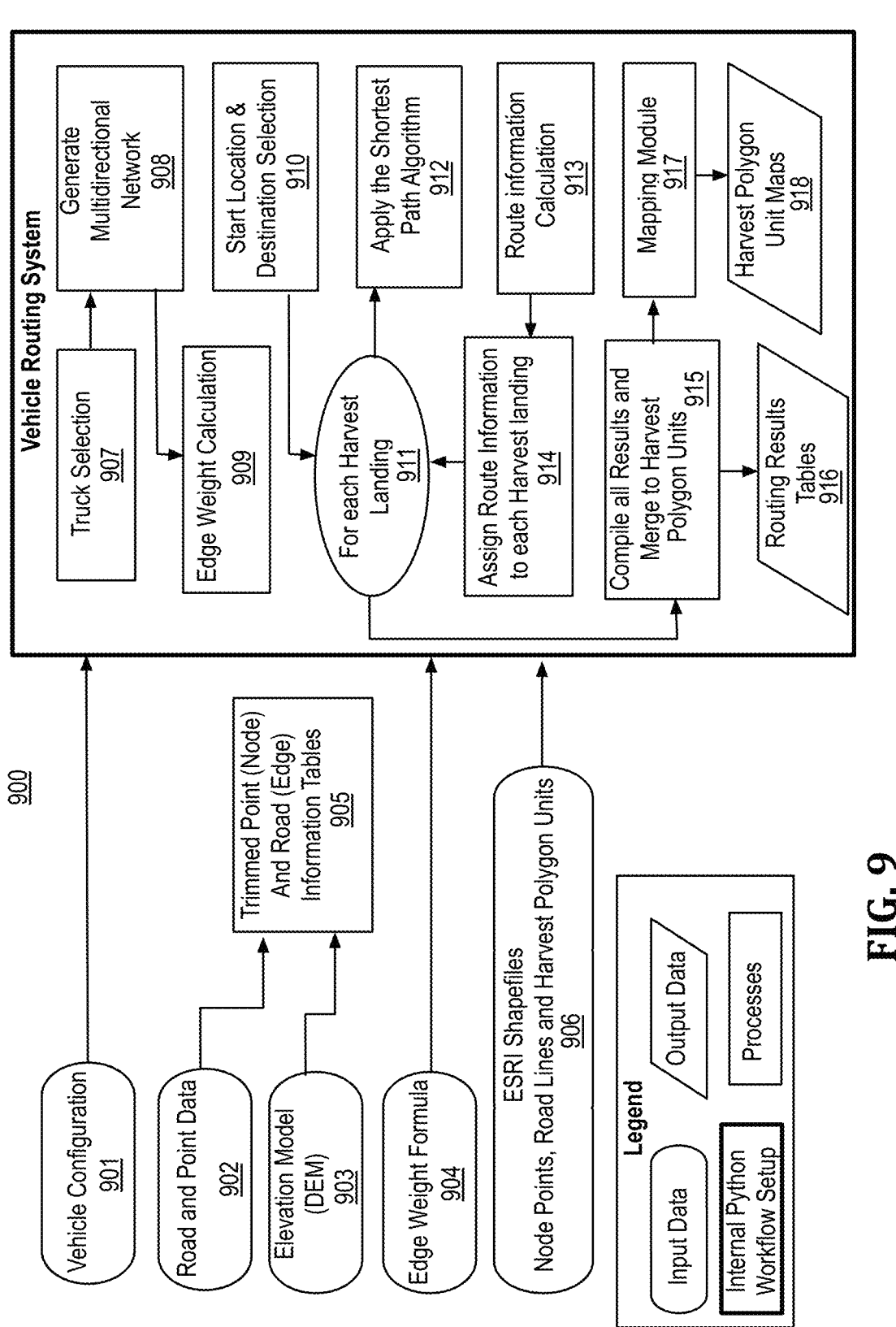
FIG. 9 is a flowchart of a method of generating a map of energy utilization in accordance with an embodiment of claimed subject matter.

FIG. 9 is a flowchart illustrating an embodiment 900 in accordance with claimed subject matter. Thus, as previously discussed, various parameters may be provided to facilitate determinations and/or estimates to be made in accordance with claimed subject matter, such as for some embodiments, selection of one or more preferred routes and/or generation of a map of energy utilization for routes across a particular landscape. Hence, block 901 depicts selection of a vehicle configuration and load, for an embodiment, as discussed previously. For example, an embodiment may handle an electric loadable vehicle without a load and an electric loadable vehicle with a load. Blocks 902 and 903, for this embodiment, depict an elevation model, DEM, and road and point parameters or attributes useful for constructing a network of routes. As explained in detail above for this embodiment, and as depicted by block 905, so-called "trimming" may be applied to the foregoing, as previously discussed and illustrated by the tables of FIG. 8, for example, along with block 906, depicting ESRI shape files, again, previously discussed as available from GIS so that geographical and/or topological values, etc., which, for example, include harvest polygon units and harvest landings, in this case, were able to coalesce conveniently for use in constructing and/or processing a network of routes, such as for a multidirectional network of routes. Furthermore, block 904 depicts use of a set of formulas, shown, for example, in FIG. 7, for an embodiment, that may be used to compute estimates of edge weights, related to estimates of energy lost or gained by traversing a particular edge as part of a route.

Having, thus, acquired the foregoing for use in performing processing, in flowchart embodiment 900, vehicle and/or load selection, such as for a heavy duty electric truck, for an embodiment, may occur as depicted by block 907. At block

908, as previously described, one or more multidirectional networks of routes for selected vehicles may be constructed, such as a network for an unloaded loadable electric vehicle and a network for a loaded loadable electric vehicle. Edge weight calculations to obtain estimates to be used as edge weights for the constructed networks may be performed, such as by block 909. For this embodiment, estimated energy utilization based at least in part on estimated regenerative energy production may be a cost of traversing a particular edge of the constructed network, reflected via a calculated estimate for an edge weight. As previously discussed, however, cost may be generalized, for other embodiments, to take into account more factors in addition to estimated energy utilization based at least in part on estimated regenerative energy production. For example, estimated travel distance, estimated travel time, and/or estimates of other costs, such as labor, wear and tear, etc., may also be factors used to determine estimates to be used as edge weights for other embodiments. At block 910, start and end points for the networks may be selected.

In an embodiment, for respective networks for respective vehicles, processing may be performed across the harvest polygon unit landings, depicted by block 911. Consequently, processing is performed for a respective harvest polygon unit landing. That is, in an embodiment of potential routes through a network of routes, a preferred route, in accordance with estimated energy utilization based at least in part on estimated regenerative energy production, viewed here as "cost," in an embodiment, may be determined from the start point to the respective harvest polygon unit landing and from the respective harvest polygon unit landing to the end point and, likewise, from the end point to the respective harvest polygon unit landing and from the respective polygon unit landing to the start point. Likewise, a loadable vehicle may be empty in one direction, such as from start point to end point, and loaded in the other direction, such as from end point to start point. Again, however, cost may be generalized to take into account more factors in addition to estimated energy utilization based at least in part on estimated regenerative energy production.

To determine at least one preferred route, for example, a "shortest" path in terms of "cost," may be determined using a shortest path finding process, depicted by block 912 In one particular embodiment, the Bellman-Ford process for finding the shortest path may be used. Benefits of using Bellman-Ford over other known processes for finding a shortest path include its ability to handle directionality along an edge segment of a network and its ability to handle negative weights, used to reflect energy gained rather than energy lost, in an embodiment, for example.

For respective harvest polygon unit landings, the "shortest" path (or "shortest" paths, for example) may be determined, thus, providing one or more preferred routes with respect to a particular harvest polygon unit landing, in this embodiment. This is depicted by block 913, in which, for an embodiment, the one or more preferred routes may be mapped, and the estimated energy utilization for the one or more preferred routes and the estimated travel time and estimated travel distance, for example, may also be calculated. Block 914, as shown, may then associate respective harvest polygon landings with preferred routes. In an embodiment, as depicted by block 915, for respective harvest polygon unit landings, results, such as estimated energy utilization, estimated time, estimated distance, etc., may be compiled so as to be associated with particular harvest polygon unit landings. At block 916, a table of routing results, for example, for the respective harvest polygon unit landings, may be produced. Thus, for the routes of the network across a particular landscape, over the set of respective harvest polygon unit landings, one or more preferred routes from the start point to the end point may be selected and one or more preferred routes from the end point to the start point may be selected, using such results.

Block 917 depicts a mapping module that, in an embodiment, may be used to generate a map, such as shown in FIG. 3, on a display coupled to a computing device, which, for example, may include a smart phone, a tablet, or a touch enabled, full color computer display, etc. Thus, a map with node points, road lines, and harvest polygon units, may be generated, for this embodiment. Likewise, for an embodiment, block 918 depicts a module to code estimated energy utilization for the harvest polygon units displayed on the map, such as by using colors, in an embodiment. For example, in one embodiment, with respect to a particular harvest polygon unit, color may be used to represent a graduated estimate of total energy utilization for a preferred route from start point to end point and from end point to start point via the particular harvest polygon unit; likewise, in another embodiment, with respect to a particular harvest polygon unit, color may be used to represent a graduated estimate of total energy utilization as a function of distance for a preferred route from start point to end point and from end point to start point via the particular harvest polygon unit.

Figure 12:
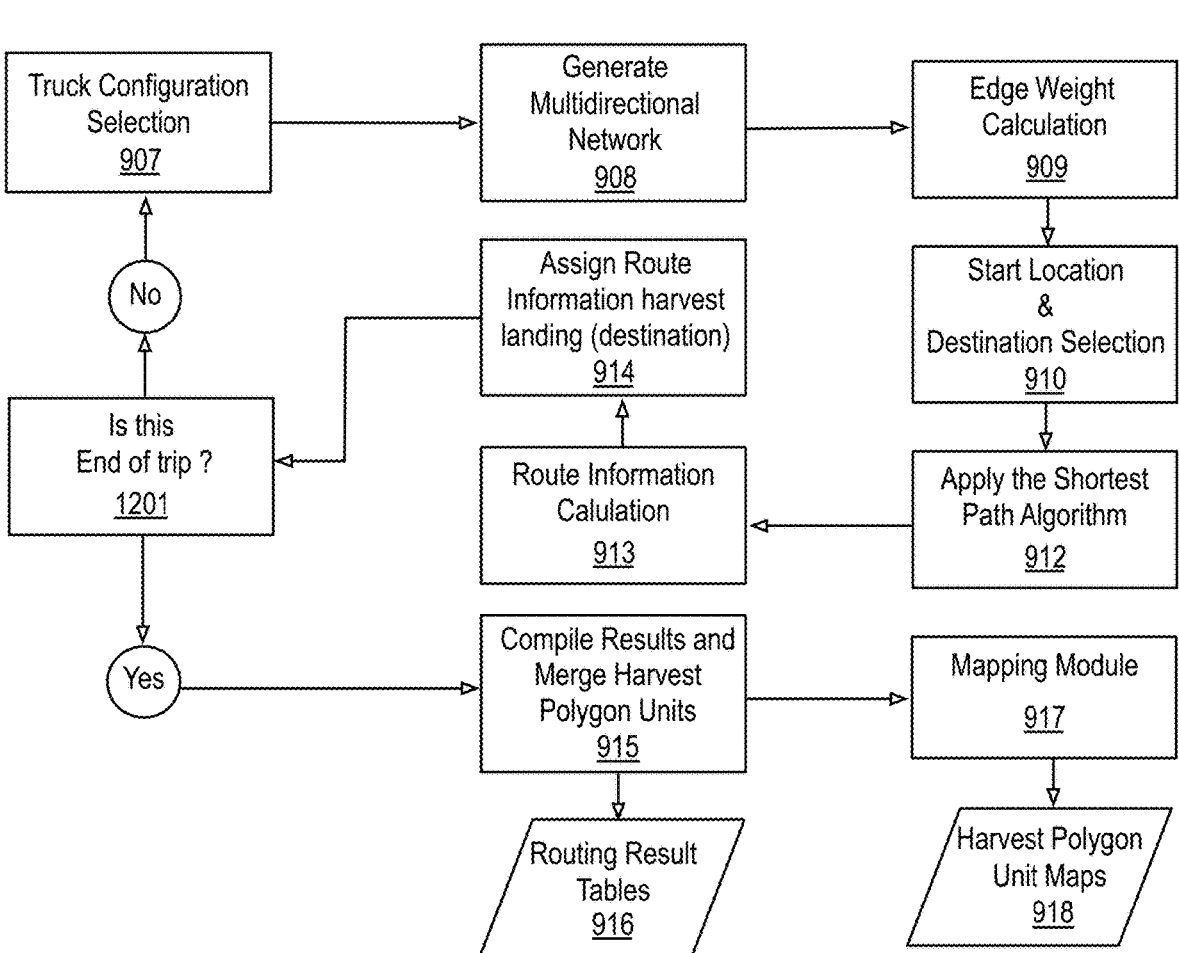
FIG. 12 is a flowchart of another method of generating a map of energy utilization in accordance with another embodiment of claimed subject matter.

FIG. 12 is a flowchart illustrating an embodiment 1200 in accordance with claimed subject matter. Reference numerals of FIG. 12 that correspond to reference numerals of FIG. 9 depict blocks that perform operations the same as or similar to the operations described with respect to FIG. 9. However, the overall arrangement of embodiment 1200 differs in several respects to permit estimating energy utilization in a situation that may include multiple loads with multiple stops typically to increase or decrease the load.

As simply a non-limiting illustrative example, one route may be referred to, here, as a trip because it may include several stops. For example, the vehicle may route from a start point unloaded to a first intermediate point where the vehicle may be partially loaded with timber, the vehicle may then route to another possible, second intermediate point and may be loaded with more timber. The vehicle may then route to the endpoint and be unloaded. However, alternatively, for this trip, the vehicle may route to a third, intermediate point and be partially unloaded, before travel to the end point, where it may be completely unloaded.

Although the trip route, as just described, refers to a start point, an end point and several intermediate points, in an embodiment, as illustrated by FIG. 12, operationally, to perform the appropriate processing, the route is broken up into several initial or start locations and several destination locations in which the load of the vehicle moving between those locations varies. Using the illustrative example above to demonstrate the operation of such an embodiment, the process begins with the route from start point to the first intermediate point with a loadable vehicle that is unloaded. Referring to FIG. 12, the process from block 907 to block 918 is quite similar to the process for those blocks described with reference to FIG. 9. However, after implementing such a process, depicted in FIG. 12, at block 1201, the question is whether the process has reached the ultimate final destination (i.e., "End of trip?"). Block 1201, therefore, asks: "is this End of trip?" For the example, it is not, so then the process moves to block 907; however, because at the first intermediate point, the vehicle is partially loaded with timber, at block 907, choices are made to reflect this load, such as altering truck weight (e.g., "Truck Weight" in FIG. 7), which, of course, impacts the process from block 907 to block 918, such as the calculations to estimate edge weights, at block 909, for example. Furthermore, at block 910, for the starting location, the first intermediate point is used and, for the destination location, the second intermediate point is used. The process then is performed again, with estimates and results accumulated and compiled, etc. After block 918, for this embodiment, again, at block 1201, the question is whether end of trip is reached? Because it is not, again, therefore, the process returns to block 907, although now the truck weight is again modified to reflect that the vehicle has been loaded with more timber. Likewise, at block 910, the second intermediate point is used for the starting location and the third intermediate point is used for the destination location. Again, then, the process is performed moving through the blocks of the flowchart and, again, after block 918, at block 1201, for this example, we assume the answer is again that the trip has not ended. However, because timber has been partially unloaded, again, at block 907, the vehicle weight is suitably adjusted. Now, at block 910, the starting location is the third intermediate point and the destination location is now the end point for the trip. Thus, after repeating the process, now at 1201, the end of the trip has ultimately been reached.

Now, all the results may be compiled and combined to determine the one or more preferred routes from start point to end point for this trip that includes several stops along the way. That is, in this example, the one or more preferred routes for the respective segments between points of the trip are combined to determine one or more preferred routes for the so-called trip. Hence, for an embodiment, similar to the route shown in FIG. 5, a preferred route may be highlighted on a display that includes a map of the particular landscape with the network of possible routes shown.

By a similar approach, for an embodiment, a colored map, such as shown in FIG. 4, for example, may also be generated. Of course, as shall be appreciated, as previously mentioned, the intermediate points comprise different harvest landings for different harvest polygon units. In an embodiment, to generate the map, for the respective harvest landings, over the entire trip, the more energy efficient route (or routes) that includes the harvest landing may be used to color code the particular harvest landing. Consequently, the embodiment flowchart of FIG. 12, permits routing and generation of an energy utilization map based at least in part on estimated regenerative energy production for a trip between two points of a network for a particular landscape with mid-trip stops in a manner that accounts for increasing or decreasing load as a result of the stops between the two points.

Referring now to FIG. 2, in an embodiment, first device 202 and third device 206 may be capable of rendering a graphical user interface (GUI) for a network device and/or a computing device, for example, so that a user-operator may engage in system use. Device 204 may potentially serve a similar function in this illustration. Likewise, in FIG. 2, computing device 202 ('first device' in figure) may interface with computing device 204 ('second device' in figure), which may, for example, comprise features of a client computing device and/or a server computing device, in an embodiment. Processor 220 (e.g., processing device) and memory 222, which may comprise primary memory 224 and secondary memory 226, may communicate by way of a communication bus 215, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. It is further noted that the term "computing device," in general, whether employed as a client and/or as a server, or otherwise, refers at least to a processor and a memory connected by a communication bus, such as illustrated in FIG. 2. Thus, a computing device, in the context of the present patent application, may comprise hardware, software, firmware, or any combinations thereof (other than software per se). Computing device 204, as depicted in FIG. 2 is merely one example, and claimed subject matter is not necessarily limited in scope to this particular example.

For one or more embodiments, a device, such as a computing device and/or networking device, may comprise, for example, any of a wide range of digital electronic devices. These may include, but are not limited to, desktop and/or laptop computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combinations of the foregoing. These may also include, but are not otherwise limited to, current and/or next generation stand-alone virtual reality (VR), augmented reality (AR), mixed reality (MR), and/or "xtended" reality (XR) devices, or any combinations of the foregoing. Likewise, the terms computing device, computer, computer device, computer system, computer platform and the like may be used interchangeable through this document without loss of generality or understanding. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a web-enabled computing device may include a physical and/or a virtual keyboard, mass storage, one or more accelerometers, one or more gyroscopes, global positioning system (GPS) and/or other location-identifying type capability, and/or a display with a high degree of functionality, such as a touch-sensitive color 2D or 3D display.

Communications between a computing device and/or a network device and a wireless network, as an example, may be in accordance with known and/or to be developed network protocols including, but not limited to, for example, global system for mobile communications (GSM), enhanced data rate for GSM evolution (EDGE), 802.11b/g/n/h, etc., worldwide interoperability for microwave access (WiMAX), 3G, 4G, 4G, 5G, as well as any or all next generation wireless network protocols, or any combinations thereof. A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that it may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

Additional details regarding the components of computing device 204 were either described previously or are described later. However, it is noted that, in an embodiment, computing device 204 may comprise a computing device or system that includes a state-of-the art graphics processor unit (GPU) and a state-of-the-art central processing unit (CPU), such as the Nvidia RTX3070 GPU, available from Nvidia Corp., and the Intel Core i9 microprocessor, available from Intel Corp., both located in San Jose, CA, as merely examples. It is noted, of course, that claimed subject matter is not limited in scope in this respect. Nonetheless, such an embodiment, for example, may include software capable of computer generating a three-dimensional energy utilization map. For example, in an embodiment, such a map may otherwise be similar to the maps previously discussed, but viewable in a three-dimensionally rendered environment, such as a three-dimensional gaming environment, as an example. Likewise, as indicated, claimed subject matter is not limited in scope in this respect.

In this context, the term "three-dimensional (3D) gaming environment" refers to a computer-generated three-dimensional virtual representation to at least in part depict a real-world environment, which may, as an example, be generated from geometric signal and/or state information, with the ability for a user to virtually move within and/or virtually interact with that three-dimensional virtual representation, if desired. For example, as user may desire to highlight a particular route shown on a landscape, for example. Furthermore, a 3D gaming environment, in an embodiment, may be fully immersive and photorealistic, as described in more detail below.

As another example of an embodiment, computing device 204 may comprise a server or even several servers, such as may be provided by Amazon Web Services (AWS), see https://aws.amazon.com/, or by Microsoft Azure, see https://azure.microsoft.com/en-us/get-started/azure-portal. For example, such one or more servers may include software executable to provide a "virtual machine," denoted VM, so that it is not necessary to own a computing device or system to have the capability to computer generate a 3D gaming environment for others to access. That is, for such an embodiment, computing device 204, for example, may be accessible via a network, such as via the Internet or the Worldwide Web. Again, claimed subject matter is not intended to be limited in scope to this illustrative example.

Thus, in an embodiment, a computing device 204 may execute 3D rendering software and/or other similar software tools to computer generate a three-dimensional gaming environment so as to render an energy utilization map similar to the maps previously discussed capable of being accessible via a computing and/or communications network, such as the Internet or Worldwide Web. A host of commercial application software is available in this regard. As simply one example, Unreal Engine software, available from Epic Games, see https://en.wikipedia.org/wiki/Unreal Engine, may be employed to computer generate a three-dimensional gaming environment. Furthermore, if employing a virtual machine, as described above, for an embodiment, AWS, see https://aws.amazon.com/about-aws/whats-new/2022/03/aws-gamekit-unreal-engine/and Azure, see https://learn.microsoft.com/en-us/gaming/azure/game-dev-virtual-machine/create-game-development-vm-for-unreal, both support Unreal Engine.

Unreal Engine (UE) is a three-dimensional (3D) computer graphics game engine developed by Epic Games, first showcased in the 1998 first-person shooter game Unreal. Initially developed for PC first-person shooters, it has since been used in a variety of genres of games and has also seen adoption by other industries, most notably the film and television industry. Written in C++, the Unreal Engine features a high degree of portability, supporting a wide range of desktop, mobile, console and/or virtual reality platforms. The latest generation, Unreal Engine 5, was launched in April 2022. Its source code is available on GitHub after registering an account, and commercial use is granted based on a royalty model. It is noted that there are several versions of Unreal Engine. For example, versions 4 and above, including versions that may later be developed, are included as illustrative examples. Of course, Unreal Engine is simply one example, and it is not intended that claimed subject matter be limited in scope to Unreal Engine.

A version of Unreal Engine, Unreal Engine 5.1, is currently available. Thus, executing on a computing device, such as 204, which may, as described, comprise a platform with one or more state of the art GPUs and CPUs, or which may comprise a virtual machine (VM), executing on one or more servers, such as via AWS or Microsoft Azure, an immersive, photorealistic, virtual three-dimensional gaming environment is able to be computer generated. Other examples of computer-generated virtual 3D gaming environments are provided in U.S. Pat. No. 8,384,710, titled "Displaying and Using 3D graphics On Multiple Displays Provided for Gaming Environments," issued to Schlott-mann, et. al., on Feb. 26, 2013; U.S. Pat. No. 10,846,937, titled "Three-Dimensional Virtual Environment," issued to Rogers et. al., on Nov. 24, 2020; and U.S. Pat. No. 11,471, 775, titled "System and Method for Providing a Computer-Generated Environment," issued to Benzies, on Oct. 18, 2022.

Likewise, a host of three-dimensional models are available or may be created that are able to be rendered on a computing device, such 204. Thus, a three-dimensional model for a map of energy utilization may be purchased or easily developed. Unreal Engine 5.1 is an example of software to computer generate a 3D model. Of course, claimed subject matter is not intended to be limited to any particular 3D model.

For one embodiment, virtual navigation, such as to highlight a route, or for another purpose, might be accomplished with a mouse, for example, in which moving the mouse may result in virtual movement within the 3D gaming environment. Likewise, a mouse, again, merely as an example, may permit zooming in and/or zooming out, perhaps via scrolling, for example. Again, these are merely illustrative examples.

Thus, once or after the 3D model is edited and complete, it may be rendered by executing Unreal Engine 5.1, for example. Once or after being rendered, a user, sometimes described as a first person in a game, as suggested above, in a "play" virtual navigation mode, would be able to virtually navigate within the 3D gaming environment to move among and/or between different potential vehicle routes. Again, in one particular virtual navigation mode, for example, this may be done via a mouse and/or similar input device. Likewise, in a "play" virtual navigation mode, it may be possible for multiple individuals to "play" at the same time, which may even be done using networking technology, as alluded to previously and described in more detail later, so individuals may "play" from separate physical locations to result in potential collaboration regarding route decision making, in an example embodiment.

For the purposes of this patent application, a "virtual reality simulation device" refers to any device or set of devices able to render and, therefore, display a three-dimensional gaming environment. Thus, typically, a computing device and/or computing system, with a suitable manner of displaying visual content in three-dimensions, comprises an example of a virtual reality simulation device. However, it may include many other devices, as well, including, as examples, but without limitation, tablets, smart phones, laptops, high resolution 2D computer displays, mobile smartphones, HDTV, video projectors, current and/or next generation virtual reality (VR), augmented reality (AR), mixed reality (MR), and/or "xtended" reality (XR) googles and/or glasses, or any combinations of the foregoing. For example, in many instances, a display device, such as a high resolution 2D computer display or virtual reality glasses or goggles, may be able to connect or couple to a computing device, for example, such as via a wired or wireless connection, to result in a "virtual reality simulation device."

Continuing with discussion of the present embodiment, 3D virtual displays are able to be populated via execution by Unreal Engine of a "blueprint script." The blueprint visual scripting system, for example, in Unreal Engine is a complete gameplay scripting system based on the concept of using a node-based interface to create gameplay elements from within the Unreal Editor. See, for example, "Introduction to Blueprints," https://docs.unrealengine.com/4.27/en-US/ProgrammingAndScripting/Blueprints/GettingStarted/#:~:text=The%20Blueprint%20Visual%20Scripting%20system,                    or %20objects%20in%20the%20engine. The blueprint visual scripts translate to executable C++ code. This system is, in some ways, perhaps, similar to Javascript and/or HTML5. Likewise, Unreal Engine, executes the blueprints written for the blueprint visual scripting system, which executes the associated C++ code this example See WebBrowser|Unreal Engine Documentation, https://docs.unrealengine.com/5.0/en-US/API/Runtime/WebBrowser/. See also Customizing the Player Web Page Unreal Engine4.27Documentation, https://docs.unrealengine.com/4.27/enUS/SharingAndReleasing/Pixel Streaming/CustomPlayer/. However, again, as mentioned, claimed subject matter is not limited in scope to employing Unreal Engine. Rather, it is provided as an illustrative example.

In terms of a 3D gaming environment, a user may be viewed as a player, often termed a "first person." This refers to the user who then may be navigating within a 3D virtual display and also be interacting with the 3D virtual display to affect the content shown or displayed. Consequently, within a 3D gaming environment, a 3D virtual display may be arranged in a particular configuration may be populated so as to form a template for the display of and/or interaction with 3D content, such as a displayed energy utilization map, as previously discussed. It is noted, for an embodiment using Unreal Engine, as an example, a "blueprint script" of the blueprint scripting system, for example, may be employed to form such templates, perhaps with a particular 3D model, depending on the particular template.

Previously, a few approaches to virtual navigating within the gaming environment between and/or among 3D virtual displays were mentioned. However, claimed subject matter is not limited in scope to those examples. Other modes and/or ways to navigate are intended to be included within the scope of claimed subject matter. It is noted, as previously discussed, for an embodiment using Unreal Engine, as an example, using a "blueprint script" of the blueprint visual scripting system, for example, various navigation modes, such as these examples, may be implemented. Perhaps, continuing, via at least one of: mouse clicks, keyboard touch events, screen touch events, remote control actuation events, speaking events, or any combinations thereof, other ways of virtual navigation within the gaming environment may be realized.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular and/or the plural, "and/or" is also used to describe a plurality and/or some other combination of features, structures, characteristics, and/or the like. Likewise, the terms "based", "based on" and/or similar terms are understood as not necessarily intending to convey an exhaustive list of factors, but to allow for existence of additional factors not necessarily expressly described.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter and/or patent eligibility. Rather, it is asserted, that physical measurements are not mental steps and, likewise, are not abstract ideas. Thus, it is understood, of course, that a distribution of scalar numerical values, for example, without loss of generality, substantially in accordance with the foregoing description and/or later description, is related to physical measurements, and is likewise understood to exist as physical signals and/or physical signal samples.

The terms "correspond", "reference", "associate", and/or similar terms relate to signals, signal samples and/or states, e.g., components of a signal measurement vector, which may be stored in memory and/or employed with operations to generate results, depending, at least in part, on the above-mentioned, signal samples and/or signal sample states. For example, a signal sample measurement vector may be stored in a memory location and further referenced wherein such a reference may be embodied and/or described as a stored relationship. A stored relationship may be employed by associating (e.g., relating) one or more memory addresses to one or more other memory addresses, for example, and may facilitate an operation, involving, at least in part, a combination of signal samples and/or states stored in memory, such as for processing by a processor and/or similar device, for example. Thus, in a particular context, "associating," "referencing," and/or "corresponding" may, for example, refer to an executable process of accessing memory contents of two or more memory locations, e.g., to facilitate execution of one or more operations among signal samples and/or states, wherein one or more results of the one or more operations may likewise be employed for additional processing, such as in other operations, or may be stored in the same or other memory locations, as may, for example, be directed by executable instructions. Furthermore, terms "fetching" and "reading" or "storing" and "writing" are to be understood as interchangeable terms for the respective operations, e.g., a result may be fetched (or read) from a memory location; likewise, a result may be stored in (or written to) a memory location.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combinations thereof. As mentioned, signal packets and/or frames, for example, may be exchanged, such as between a server device and/or a client device, as well as other types of devices, including between wired and/or wireless devices coupled via a wired and/or wireless network, for example, or any combinations thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combinations thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, a portion of the Internet. Thus, for example, a network "in the cloud," such as a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The terms electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter is not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content," "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the terms attributes (e.g., one or more attributes) and/or parameters (e.g., one or more parameters) refer to material descriptive of a collection of signal samples, such as one or more electronic documents and/or electronic files, and exist in the form of physical signals and/or physical states, such as memory states. For example, one or more parameters and/or attributes, such as referring to an electronic document and/or an electronic file comprising an image, may include, as examples, time of day at which an image was captured, latitude and longitude of an image capture device, such as a camera, for example, etc. In another example, one or more parameters and/or attributes relevant to digital content, such as digital content comprising a technical article, as an example, may include one or more authors, for example. Claimed subject matter is intended to embrace meaningful, descriptive attributes and/or parameters in any format, so long as the one or more parameters and/or attributes comprise physical signals and/or states, which may include, as examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between physical nodes of a physical network, where a physical node may comprise one or more network devices and/or one or more computing devices, for example. As an illustrative example, but without limitation, a physical node may comprise one or more sites employing a local network address, such as in a local network address space. Likewise, a device, such as a network device and/or a computing device, may be associated with that physical node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via a physical access node coupled to the Internet or vice-versa. Likewise, a signal packet and/or frame may be forwarded via physical network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a physical network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, PCI and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, 4$^{th}$ and/or 5th generation (2G, 3G, 4G, and/or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

In one example embodiment, as shown in FIG. 2, a system embodiment may comprise a local network (e.g., device 204 and device-readable medium 240) and/or another type of network, such as a computing and/or communications network. For purposes of illustration, therefore, FIG. 2 shows an embodiment 200 of a system that may be employed to implement either type or both types of networks. Network 208 may comprise one or more network connections, links, processes, services, applications, and/or resources to facilitate and/or support communications, such as an exchange of communication signals, for example, between a computing device, such as 202, and another computing device, such as device 206, which may, for example, comprise one or more client computing devices and/or one or more server computing device. By way of example, but not limitation, network 208 may comprise wireless and/or wired communication links, telephone and/or telecommunications systems, Wi-Fi networks, Wi-MAX networks, the Internet, a local area network (LAN), a wide area network (WAN), or any combinations thereof.

As mentioned, example devices in FIG. 2 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor," for example, is understood to connote a specific structure such as a central processing unit (CPU) of a computing device which may include a control unit and an execution unit. In an aspect, a processor may comprise a device that interprets and executes instructions to process input signals to provide output signals. As such, in the context of the present patent application at least, computing device and/or processor are understood to refer to sufficient structure within the meaning of 35 USC § 112(f) so that it is specifically intended that 35 USC § 112(f) not be implicated by use of the term "computing device," "processor" and/or similar terms; however, if it is determined, for some reason not immediately apparent, that the foregoing understanding cannot stand and that 35 USC § 112(f), therefore, necessarily is implicated by the use of the term "computing device," "processor" and/or any other terms, then, it is intended, pursuant to that statutory section, that corresponding structure, material and/or acts for performing one or more functions be understood and be interpreted to be described at least in FIG. 2 and in the text associated with FIG. 2 of the present patent application.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 2, processor 220 may comprise one or more circuits, such as digital circuits, to perform at least a portion of a computing procedure and/or process. By way of example, but not limitation, processor 220 may comprise one or more processors, such as controllers, microprocessors, microcontrollers, application specific integrated circuits, digital signal processors, programmable logic devices, field programmable gate arrays, the like, or any combinations thereof. In various implementations and/or embodiments, processor 220 may perform signal processing, typically substantially in accordance with fetched executable computer instructions, such as to manipulate signals and/or states, to construct signals and/or states, etc., with signals and/or states generated in such a manner to be communicated and/or stored in memory, for example.

Memory 222 may store electronic files and/or electronic documents, such as relating to one or more users, and may also comprise a computer-readable medium that may carry and/or make accessible content, including code and/or instructions, for example, executable by processor 220 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, attributes, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining," "establishing," "obtaining," "identifying," "selecting," "generating," and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

FIG. 2 also illustrates device 204 as including a component 232 operable with input/output devices and communication interface 230, for example, so that signals and/or states may be appropriately communicated between devices, such as device 204 and an input device and/or device 204 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals, referred to, for example, as a speaking event. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

I claim:

1. A method comprising:

executing instructions by one or more processors coupled to one or more memories in which executable instructions are stored on at least one of the one or more memories, wherein executing the instructions results in:

routing of one or more vehicles using one or more multidirectional network graphs with negative edge weights to estimate energy utilization based at least in part on estimated regenerative braking along segments of the one or more multidirectional network graphs, wherein the routing comprises using estimated energy loss and/or estimated energy generation as an edge weight, wherein the one or more multidirectional network graphs represent a landscape, and wherein the routing applies a Bellman-Ford algorithm to accommodate the negative edge weights that represent estimated regenerative energy production along road segments;

performing, for respective interconnected road segments forming routes within the one or more multidirectional network graphs, an edge weight calculation applying modified Sessions and Lyons formula producing edge weight estimates for the respective interconnected road segments based at least in part on a set of factors including:

an estimated regenerative energy production along the respective interconnected road segments by the one or more vehicles, an estimated distance traveled along the respective interconnected road segments by the one or more vehicles, an estimated slope along the respective interconnected road segments, an estimated rolling resistance of the one or more vehicles along the respective interconnected road segments, an estimated air resistance of the one or more vehicles along the respective interconnected road segments, an estimated gravity resistance of the one or more vehicles along the respective interconnected road segments, and real-time weather reporting data affecting regenerative braking efficiency, wherein regenerative energy production occurs when the estimated gravity resistance overcomes the estimated air resistance and the estimated rolling resistance;

generating, based on the routing, a color-coded map depicting estimated energy utilization by the one or more vehicles across the landscape, wherein the color-coded map operates as a visual aid showing energy efficient routes accounting for regenerative energy production to provide real-time understanding of routing options;

selecting at least one preferred route from the one or more multidirectional network graphs based on the estimated energy utilization; and controlling an operation of at least one of the one or more vehicles by:

transmitting the selected preferred route to the at least one vehicle; and automatically adjusting regenerative braking operations of the at least one vehicle based on the estimated regenerative braking along segments of the selected preferred route and the real-time weather reporting data.

2. The method of claim 1, wherein the one or more vehicles comprise one or more electric vehicles.

3. An article comprising: a non-transitory storage medium including executable instructions stored thereon, wherein executing the executable instructions results in:

routing of one or more vehicles using one or more multidirectional network graphs with negative edge weights to estimate energy utilization based at least in part on estimated regenerative braking potential and regenerative energy production along segments of the one or more multidirectional network graphs, wherein the routing comprises using estimated energy loss and/or estimated energy generation as an edge weight, wherein the one or more multidirectional network graphs represent a landscape, and wherein the routing applies a Bellman-Ford algorithm to accommodate the negative edge weights representing estimated regenerative energy production along road segments;

performing, for respective interconnected road segments forming routes within the one or more multidirectional network graphs, an edge weight calculation applying modified Sessions and Lyons formulas producing edge weight estimates for the respective interconnected road segments based at least in part on a set of factors including:

an estimated regenerative energy production along the respective interconnected road segments by the one or more vehicles, an estimated distance traveled along the respective interconnected road segments by the one or more vehicles, an estimated slope along the respective interconnected road segments, estimated rolling resistance of the one or more vehicles along the respective interconnected road segments, an estimated air resistance of the one or more vehicles along the respective interconnected road segments, an estimated gravity resistance of the one or more vehicles along the respective interconnected road segments, and real-time weather reporting data affecting regenerative braking efficiency, wherein regenerative energy production occurs when the estimated gravity resistance overcomes the estimated air resistance and the estimated rolling resistance;

generating, based on the routing, a color-coded map depicting estimated energy utilization and regenerative energy capture opportunities by the one or more vehicles across the landscape, wherein the color-coded map operates as a visual aid showing energy efficient routes accounting for regenerative energy production to provide real time understanding of routing options;

selecting at least one preferred route from the one or more multidirectional network graphs based on maximizing regenerative energy capture during the estimated energy utilization; and controlling an operation of at least one of the one or more vehicles by:

transmitting the selected preferred route and regenerative braking parameters to the at least one vehicle, tracking actual regenerative energy production along segments of the selected preferred route, and dynamically adjusting regenerative braking operations of the at least one vehicle based on comparing actual versus estimated regenerative energy production and the real-time weather reporting data.

4. The article of claim 3, wherein the one or more vehicles comprise one or more electric vehicles.

5. The article of claim 3, wherein coding for the color-coded map comprises color coding.

6. A computing device comprising: one or more processors coupled to one or more memories, wherein the one or more memories include executable instructions stored thereon, wherein executing the instructions results in:

routing of one or more vehicles using one or more multidirectional network graphs with negative edge weights to estimate energy utilization based at least in part on estimated regenerative braking potential and regenerative energy production rates along segments of the one or more multidirectional network graphs, wherein the routing comprises using estimated energy loss and/or estimated energy generation as an edge weight, wherein the one or more multidirectional network graphs represent a landscape, and wherein the routing applies a Bellman-Ford algorithm to accommodate the negative edge weights representing estimated regenerative energy production along road segments;

performing, for respective interconnected road segments forming routes within the one or more multidirectional network graphs, an edge weight calculation applying modified Sessions and Lyons formulas producing edge weight estimates for the respective interconnected road segments based at least in part on a set of factors including:

an estimated regenerative energy production along the respective interconnected road segments by the one or more vehicles, an estimated distance traveled along the respective interconnected road segments by the one or more vehicles, an estimated slope along the respective interconnected road segments, an estimated rolling resistance of the one or more vehicles along the respective interconnected road segments, an estimated air resistance of the one or more vehicles along the respective interconnected road segments, an estimated gravity resistance of the one or more vehicles along the respective interconnected road segments, and real-time weather reporting data affecting regenerative braking efficiency;

generating, based on the routing, a color-coded map depiction estimated energy utilization and regenerative energy capture opportunities by the one or more vehicles across the landscape, wherein the color-coded map operates as a visual aid showing energy efficient routes accounting for regenerative energy production to provide real-time understanding of routing options;

selecting at least one preferred route from the one or more multidirectional network graphs based on maximizing regenerative energy capture during the estimated energy utilization; and controlling an operation of at least one of the one or more vehicles by:

transmitting the selected preferred route and regenerative braking parameters to the at least one vehicle, tracking actual regenerative energy production along segments of the selected preferred route, and dynamically adjusting regenerative braking operations of the at least one vehicle based on comparing actual versus estimated regenerative energy production and the real-time weather reporting data.

7. The computing device of claim 6, wherein the one or more vehicles comprise one or more electric vehicles.

8. A method comprising:

executing instructions by one or more processors coupled to one or more memories in which executable instructions are stored on at least one of the one or more memories, wherein executing the executable instructions results in:

selecting a start point and an end point for a loadable vehicle within a network of routes;

estimating energy utilization for the routes within the network of routes for the loadable vehicle from the start point to one or more respective intermediate points within the network and from the one or more respective intermediate points to the end point and/or from the end point to the one or more respective intermediate points and from the one or more respective intermediate points to the start point, based at least in part on regenerative braking potential and estimated regenerative energy production rates along the routes, wherein the estimating applies a Bellman-Ford algorithm applied to a multidirectional network graph with negative edge weights to accommodate estimated regenerative energy production along road segments;

performing, for respective interconnected road segments forming routes within the network, an edge weight calculation applying modified Sessions and Lyons formulas producing edge weight estimates for the respective interconnected road segments based at least in part on a set of factors including:

an estimated regenerative energy production along the respective interconnected road segments by the loadable vehicles, an estimated distance traveled along the respective interconnected road segments by the one or more loadable vehicles, an estimated slope along the respective interconnected road segments, an estimated rolling resistance of the loadable vehicles along the respective interconnected road segments, an estimated air resistance of the loadable vehicles along the respective interconnected road segments, an estimated gravity resistance of the loadable vehicles along the respective interconnected road segments, and real-time weather reporting data affecting regenerative braking efficiency;

generating, based on the estimating, a color-coded map depicting estimated energy utilization and regenerative energy capture opportunities across the network of routes, wherein the color-coded map operates as a visual aid showing energy efficient routes accounting for regenerative energy production to provide real-time understanding of routing options;

selecting at least one preferred route based at least in part on maximizing regenerative energy capture during the estimated energy utilization; and controlling an operation of the loadable vehicle by:

transmitting the selected preferred route and regenerative braking parameters to the loadable vehicle, tracking actual regenerative energy production along segments of the selected preferred route, and dynamically adjusting regenerative braking operations of the loadable vehicle based on comparing actual versus estimated regenerative energy production and the real-time weather reporting data.

9. The method of claim 8, wherein executing the instructions further results in:

generating a coded energy utilization map for the network across a landscape comprising the network based at least in part on the estimated regenerative energy production along the routes by the loadable vehicle.

10. The method of claim 9, wherein coding for the coded energy utilization map comprises color coding.

11. The method of claim 9, wherein estimating the energy utilization is performed for the loadable vehicle along the routes with the loadable vehicle being unloaded, partially loaded with one or more partial loads, and/or fully loaded.

12. The method of claim 8, wherein the estimating energy utilization, comprises:

selecting the loadable vehicle and at least one load;

generating a multidirectional network of the routes within the network at least for the selected loadable vehicle when loaded and at least for the selected loadable vehicle when unloaded in which the routes respectively comprise a series of respective interconnected road segments;

performing, for the respective interconnected road segments forming the routes within the multidirectional network, an edge weight calculation producing edge weight estimates for the respective interconnected road segments, for at least the selected loadable vehicle and for at least the selected loadable vehicle when unloaded, based at least in part on a set of factors including:

an estimated regenerative energy production along the respective interconnected road segments by the selected loadable vehicle, an estimated distance traveled along the respective interconnected road segments by the selected loadable vehicle, an estimated slope along the respective interconnected road segments, an estimated rolling resistance of the selected loadable vehicle along the respective interconnected road segments, real-time weather reporting data affecting regenerative braking efficiency, an estimated air resistance of the selected loadable vehicle along the respective interconnected road segments, and/or an estimated gravity resistance of the selected loadable vehicle along the respective interconnected road segments; and determining, via the edge weight estimates for the respective interconnected road segments, a lowest cost and/or one or more lower cost route at least in terms of estimated energy utilization based at least in part on regenerative energy production to and from the start point and the end point via the one or more respective intermediate points within the network and the real-time weather reporting data.

13. The method of claim 8, wherein executing the instructions further results in:

highlighting, on a generated map of the network of routes, at least one preferred route.

14. The method of claim 13, further comprises determining lowest cost and/or one or more lower cost routes based at least in part on one or more additional factors including at least one of:

an estimated total travel time, an estimated total travel distance, a battery capacity, locations of charging stations, an estimated cost of human labor, real-time weather reporting, real-time traffic reporting, or any combination thereof.

15. The method of claim 13, wherein executing the instructions further results in:

tracking in real-time, via the generated map, movement of the loadable vehicle along the at least one preferred route.

16. The method of claim 15, wherein the tracking in real-time the movement of the loadable vehicle along the at least one preferred route comprises tracking in real-time movement of a fleet of loadable vehicles in which the movement of the fleet of loadable vehicles is along preferred routes for the loadable vehicles of the fleet.

17. A computing device comprising: one or more processors coupled to one or more memories, wherein the one or more memories include executable instructions stored thereon, wherein executing the executable instructions results in:

selecting a start point and an end point for a loadable vehicle within a network of routes;

estimating energy utilization for the routes of the network of routes for the loadable vehicle from the start point to one or more respective intermediate points within the network and from the one or more respective intermediate points to the end point and/or from the end point to the one or more respective intermediate points and from the one or more respective intermediate points to the start point, based at least in part on regenerative braking potential and estimated regenerative energy production rates along the routes by the loadable vehicle, and wherein the estimating applies a Bellman-Ford algorithm applied to a multidirectional network graph with negative edge weights to accommodate estimated regenerative energy production along road segments;

performing, for respective interconnected road segments forming routes within the network, an edge weight calculation applying modified Sessions and Lyons formulas producing edge weight estimates for the respective interconnected road segments based at least in part on a set of factors including:

an estimated regenerative energy production along the respective interconnected road segments by the loadable vehicles, an estimated distance traveled along the respective interconnected road segments by the loadable vehicles, an estimated slope along the respective interconnected road segments, an estimated rolling resistance of the loadable vehicles along the respective interconnected road segments, an estimated air resistance of the loadable vehicles along the respective interconnected road segments, an estimated gravity resistance of the loadable vehicles along the respective interconnected road segments, and real-time weather reporting data affecting regenerative braking efficiency;

generating, based on the estimating, a color-coded map depicting estimated energy utilization and regenerative energy capture opportunities across the network of routes, wherein the color-coded map operates as a visual aid showing energy efficient routes accounting for regenerative energy production to provide real-time understanding of routing options;

selecting at least one preferred route based on maximizing regenerative energy capture during the estimated energy utilization; and controlling an operation of the loadable vehicle by:

transmitting the selected preferred route and regenerative braking parameters to the loadable vehicle, tracking actual regenerative energy production along segments of the selected preferred route, and dynamically adjusting regenerative braking operations of the loadable vehicle based on comparing actual versus estimated regenerative energy production and the real-time weather reporting data.

18. The computing device of claim 17, wherein the loadable vehicle comprises an electric vehicle.

19. An article comprising: a non-transitory storage medium including executable instructions stored thereon, wherein executing the executable instructions results in:

selecting a start point and an end point for a loadable vehicle within a network of routes;

estimating energy utilization for the routes of the network of routes for the loadable vehicle from the start point to one or more respective intermediate points within the network and from the one or more respective intermediate points to the end point and/or from the end point to the one or more respective intermediate points and from the one or more respective intermediate points to the start point, based at least in part on regenerative braking potential and estimated regenerative energy production along the routes by the loadable vehicle, wherein the estimating uses a Bellman-Ford algorithm applied to a multidirectional network graph with negative edge weights to accommodate estimated regenerative energy production along road segments;

performing, for respective interconnected road segments forming routes within network, an edge weight calculation applying modified Sessions and Lyons formulas producing edge weight estimates for the respective interconnected road segments based at least in part on a set of factors including:

an estimated regenerative energy production along the respective interconnected road segments by the loadable vehicles, an estimated distance traveled along the respective interconnected road segments by the one or more vehicles, an estimated slope along the respective interconnected road segments, an estimated rolling resistance of the loadable vehicles along the respective interconnected road segments, an estimated air resistance of the loadable vehicles along the respective interconnected road segments, an estimated gravity resistance of the loadable vehicles along the respective interconnected road segments, and real-time weather reporting data affecting regenerative braking efficiency;

generating, based on the estimating, a color-coded map depicting estimated energy utilization and regenerative energy capture opportunities across the network of routes, wherein the color-coded map operates as a visual aid showing energy efficient routes accounting for regenerative energy production to provide real-time understanding of routing options;

selecting at least one preferred route based at least in part on maximizing regenerative energy capture during the estimated energy utilization; and controlling operation of the loadable vehicle by:

transmitting the selected preferred route and regenerative braking parameters to the loadable vehicle, tracking actual regenerative energy production along segments of the selected preferred route, and dynamically adjusting regenerative braking operations of the loadable vehicle based on comparing actual versus an estimated regenerative energy production and the real-time weather reporting data.

20. The article of claim 19, wherein the loadable vehicle comprises an electric vehicle.

* * * * *